US011016717B1

(12) United States Patent
Muthukrishnan et al.

(10) Patent No.: US 11,016,717 B1
(45) Date of Patent: May 25, 2021

(54) SELECTIVE ELECTRONIC CONTENT CASTING

(71) Applicant: MICROSOFT TECHNOLOGY LICENSING, LLC, Redmond, WA (US)

(72) Inventors: Arvind Muthukrishnan, Redmond, WA (US); Prasad Thiruveedu, Redmond, WA (US); Sourabh Kukreja, Redmond, WA (US); Archana Saseetharan, Redmond, WA (US); Matthew Kyle Philpott, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/679,139

(22) Filed: Nov. 8, 2019

(51) Int. Cl.
*G06F 3/14* (2006.01)
*H04L 29/06* (2006.01)
*H04W 4/80* (2018.01)

(52) U.S. Cl.
CPC ............ *G06F 3/1462* (2013.01); *H04L 65/60* (2013.01); *H04W 4/80* (2018.02)

(58) Field of Classification Search
CPC ......... H04N 21/4104; H04N 21/43637; H04N 21/44227; H04N 21/4622; H04N 21/8456; H04N 21/41407; H04N 21/436; H04N 21/43615; H04N 21/4363; H04N 21/4524; H04N 21/4532; H04N 21/466; H04N 21/472; H04N 21/4755

See application file for complete search history.

(56) References Cited

U.S. PATENT DOCUMENTS

| 6,275,174 B1 | 8/2001 | Stork et al. |
| 9,276,972 B2 | 3/2016 | Sheih et al. |
| 9,609,395 B2 | 3/2017 | Abecassis et al. |

(Continued)

FOREIGN PATENT DOCUMENTS

EP 3008545 A2 4/2016

OTHER PUBLICATIONS

"Cast a Chrome Tab on Your Tv", Retrieved from: https://support.google.com/chromecastbuiltin/answer/3228332?co=GENIE.Platform%3DDesktop&hl=en, Retrieved Date: Aug. 20, 2019, 3 Pages.

(Continued)

*Primary Examiner* — Nelson M Rosario
(74) *Attorney, Agent, or Firm* — NovoTechIP International PLLC

(57) ABSTRACT

Techniques for casting electronic content, including identifying, at a first time, a first action by a user of a presenter device affecting rendering of a content item casted to a target device; determining that the presenter device is in a first casting mode at the first time; based on the presenter device being in the first casting mode at the first time, changing a rendering of the content item by the target device by causing the first action to be reported in real-time to the target device; identifying, at a second time, a second action by the user that affects a rendering of the content item; determining that the presenter device is in a second casting mode at the second time; and determining that the second action will not be reported to the target device based on the presenter device being in the second casting mode at the second time.

20 Claims, 19 Drawing Sheets

(56) References Cited

U.S. PATENT DOCUMENTS

| | | | |
|---|---|---|---|
| 9,706,241 | B2 | 7/2017 | Felt et al. |
| 2005/0091302 | A1 | 4/2005 | Soin et al. |
| 2012/0077586 | A1 | 3/2012 | Pishevar |
| 2013/0106888 | A1 | 5/2013 | Penner et al. |
| 2014/0111700 | A1* | 4/2014 | Paxinos ............. H04N 21/4222 348/734 |
| 2014/0310348 | A1 | 10/2014 | Keskitalo et al. |
| 2016/0088328 | A1 | 3/2016 | Mcrae |
| 2016/0173937 | A1 | 6/2016 | Shih et al. |
| 2017/0026686 | A1 | 1/2017 | Glazier et al. |
| 2018/0275948 | A1* | 9/2018 | Xu ......................... G06F 3/1454 |
| 2019/0182300 | A1 | 6/2019 | Simotas et al. |
| 2019/0320219 | A1* | 10/2019 | Yoden ................... G06F 3/0486 |

OTHER PUBLICATIONS

"Cast your Android Screen From the Google Home App", Retrieved From: https://support.google.com/chromecastbuiltin/answer/6059461?hl=en, Retrieved Date: Aug. 20, 2019, 2 Pages.

"Google Cast for Education Help", Retrieved from: https://web.archive.org/web/20190427082337/https:/support.google.com/edu/castforedu/?hl=en, Apr. 27, 2019, 5 Pages.

"How to AirPlay Video and Mirror Your Device's Screen", Retrieved from: https://support.apple.com/It-It/HT204289, Retrieved Date: Aug. 20, 2019, 7 Pages.

"If You Can't Use AirPlay or Mirror Your Device's Screen", Retrieved from: https://web.archive.org/web/20190807164451/https:/support.apple.com/en-in/HT204291, Aug. 7, 2019, 5 Pages.

"Intel Pro Wireless Display", Retrieved from: https://www.intel.com/content/dam/www/public/us/en/documents/guides/enterprise-security-pro-wireless-display-guide.pdf, Nov. 2015, 52 Pages.

"Set up Guest Mode—Chromecast Help", Retrieved from: https://support.google.com/chromecast/answer/6109286?hl=en-IN, Retrieved Date: Aug. 20, 2019, 4 Pages.

"Stream Content Using AirPlay With Apple TV", Retrieved from: https://support.apple.com/en-in/guide/tv/atvbf2be9ef7/tvos, Retrieved Date: Aug. 20, 2019, 5 Pages.

"Use Nearby to Find Chromecast Devices", Retrieved from: https://support.google.com/chromecast/answer/7073953?hl=en-IN, Retrieved Date: Aug. 20, 2019, 4 Pages.

"Use Screens Better", Retrieved from: https://web.archive.org/web/20190621084629/https:/airtame.com/, Jun. 21, 2019, 17 Pages.

Burgess, Brian, "Enable Media Streaming in Windows Home Server to Windows Media Player", Retrieved from: https://www.howtogeek.com/howto/13086/enable-media-streaming-in-windows-home-server-to-windows-media-player/, Mar. 18, 2010, 12 Pages.

Burgess, Brian, "Share and Stream Digital Media Between Windows 7 Machines on Your Home Network", Retrieved from: https://www.howtogeek.com/howto/9469/share-and-stream-digital-media-between-windows-7-machines-on-your-home-network/, Jan. 26, 2010, 17 pages.

Geel, et al., "PresiShare: Opportunistic Sharing and Presentation of Content Using Public Displays and QR Codes", In Proceedings of the 2nd ACM International Symposium on Pervasive Displays, Jun. 4, 2013, pp. 103-108.

Lowe, Scott, "Secure Your Media Services with Windows Media Administrator", Retrieved from: https://www.techrepublic.com/article/secure-your-media-services-with-windows-media-administrator/, Mar. 14, 2002, 12 Pages.

Rich, Jason R., "9 Google Chromecast Hacks to Make Life Easier", Retrieved from: https://www.lifewire.com/chromecast-hacks-4161242, Retrieved Date: Aug. 20, 2019, 22 Pages.

Suppers, et al., "Casual Mobile Screen Sharing", In Proceedings of the Fifteenth Australasian User Interface Conference, Jan. 20, 2014, pp. 95-96.

"International Search Report and Written Opinion Issued in PCT Application No. PCT/US20/058073", dated Feb. 10, 2021, 10 Pages.

\* cited by examiner

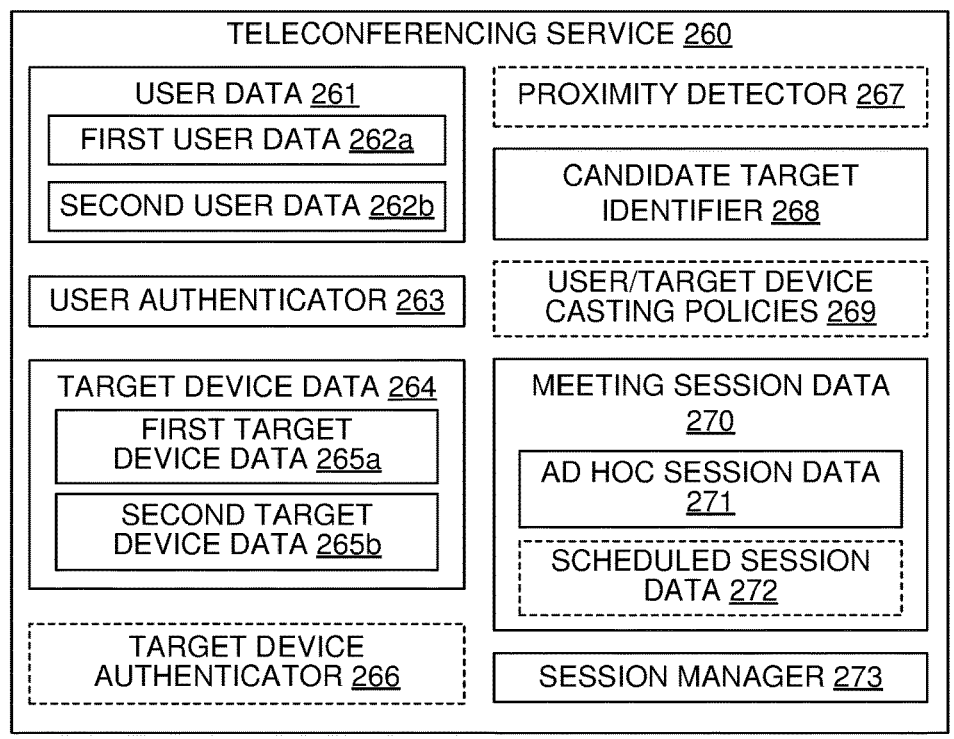
FIG. 2B
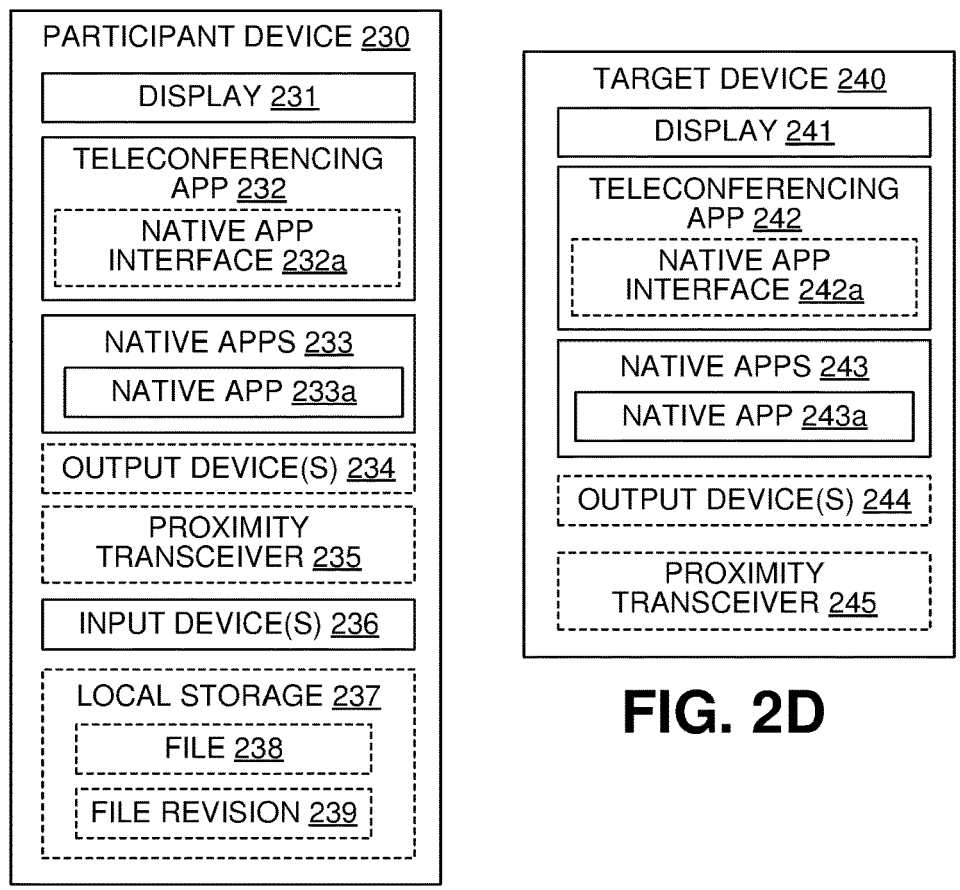
FIG. 2C
FIG. 2D

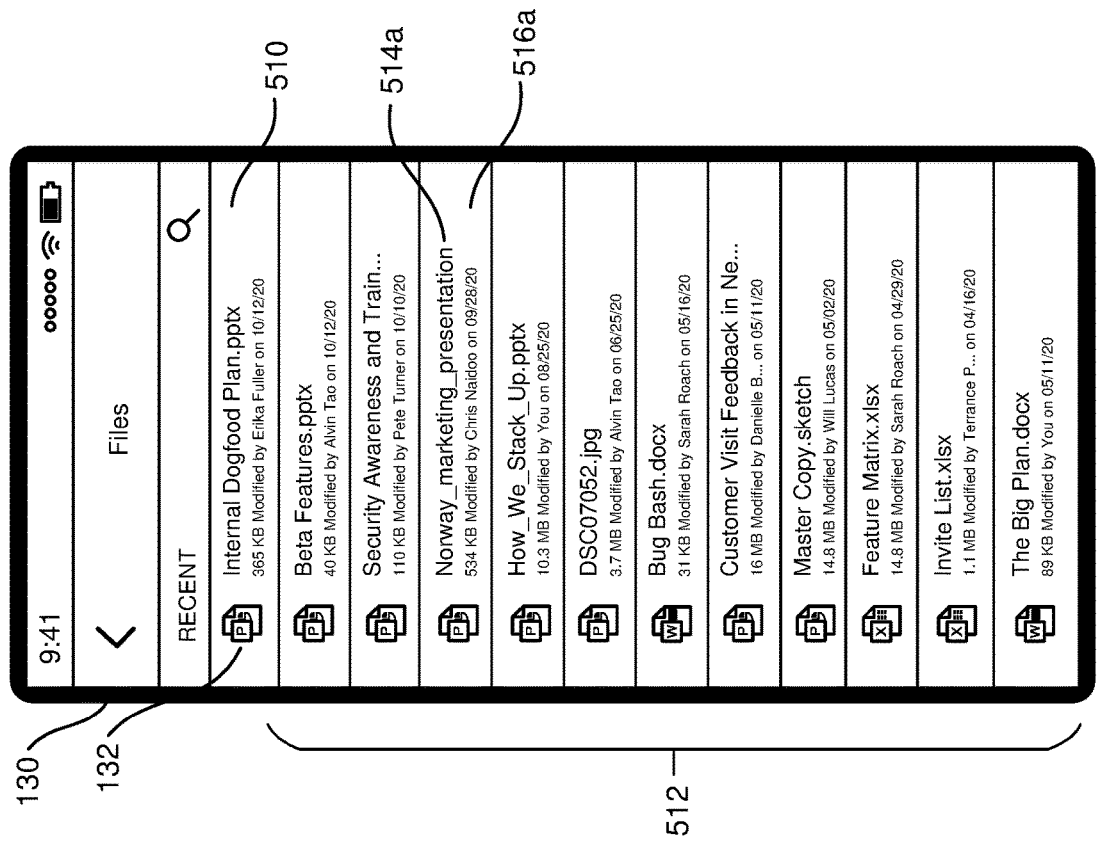
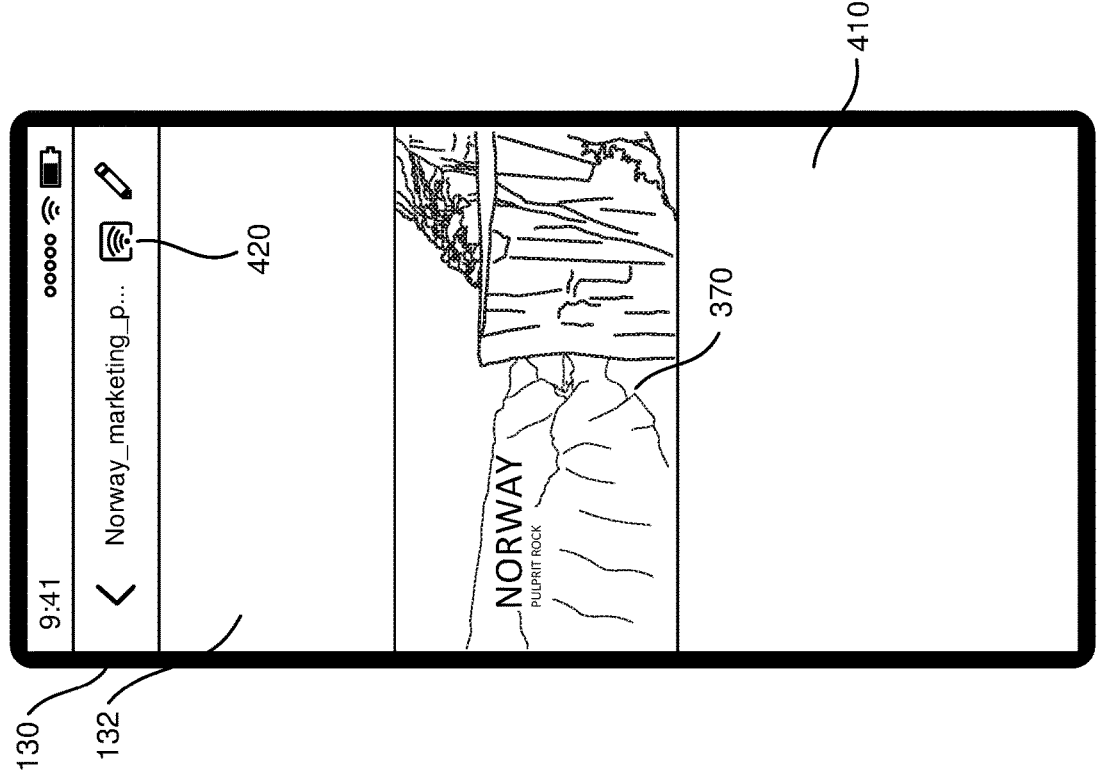
FIG. 5A
FIG. 4

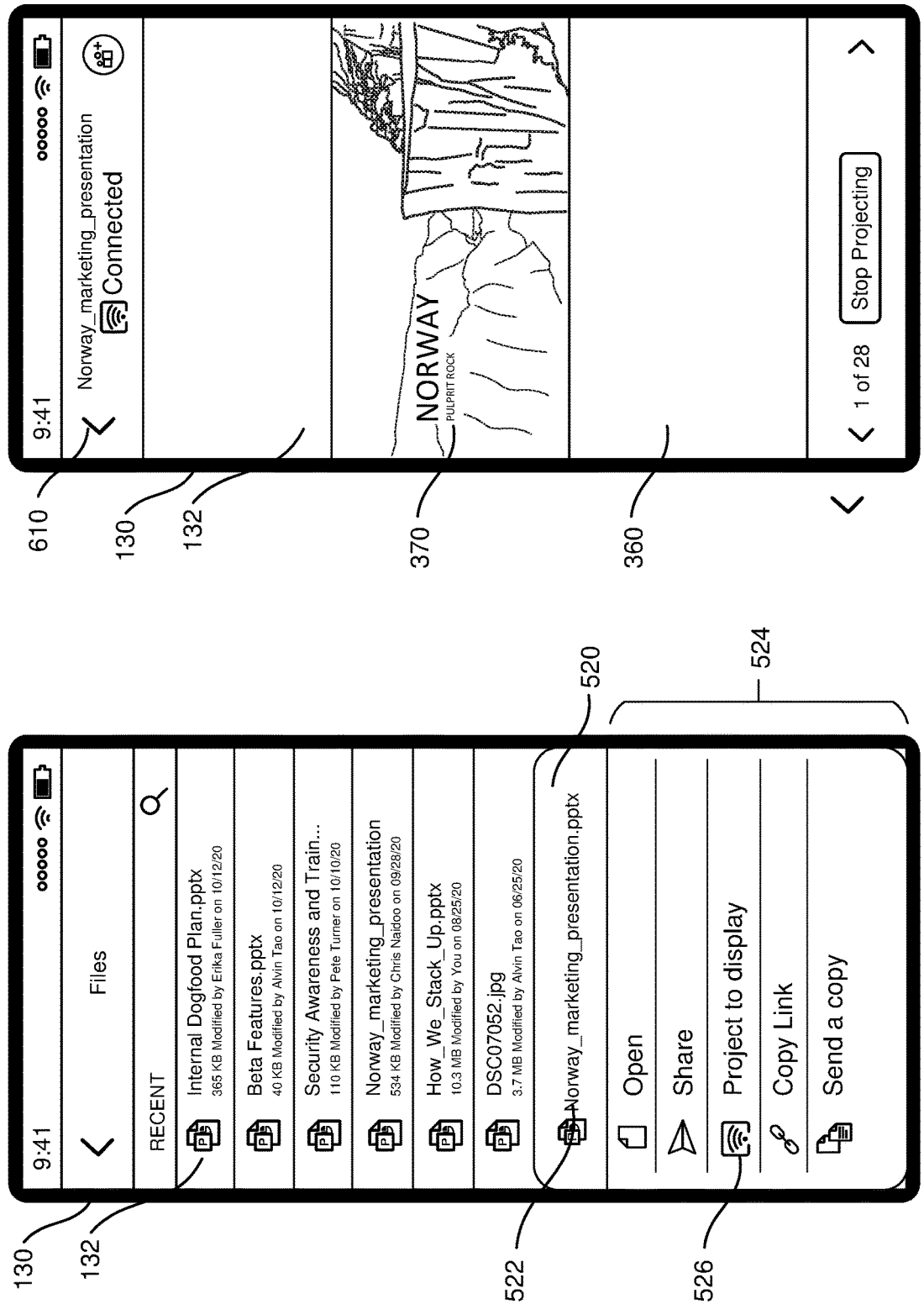

SELECTIVE ELECTRONIC CONTENT CASTING

BACKGROUND

Although there are various consumer-oriented devices available for performing media stream casting, such as for an online movie service, and there are screencasting capabilities provided by various teleconferencing applications and services, in general these approaches are not well suited for a workplace or enterprise environment wishing to deploy casting target devices in significant numbers and/or across many locations. For example, many of the consumer-oriented devices operate with a "same network" requirement, such as to perform peer-to-peer communications. Also, many casting schemes require performing a one-to-one pairing/authorization processes between a particular pair of a presenting device controlling a casting session and a casting target device (which may include, for example, a large format screen suitable for distance viewing by multiple people). There is a need for improving casting techniques to obtain more dynamic and fluid casting interactions in newer workplace scenarios.

SUMMARY

A system for casting electronic content, in accord with a first aspect of this disclosure, includes one or more processors and machine-readable media including instructions which, when executed by the one or more processors, may cause the one or more processors to identify, at a first time during a casting session, a first action performed by a user of a presenter computing device affecting rendering of a first electronic content item being casted to a first target computing device via the casting session. The instructions may also cause the one or more processors to determine that the presenter computing device is operating in a first casting mode at the first time. Furthermore, the instructions may cause the one or more processors to, based on at least the determination that the presenter computing device is operating in the first casting mode at the first time, change a rendering of the first electronic content item by the first target computing device by causing the first action to be reported in real-time to the first target computing device. The instructions also may cause the one or more processors to identify, at a second time during the casting session, a second action performed by the user affecting rendering of the first electronic content item, wherein the second time is different than the first time. Also, the instructions may cause the one or more processors to determine that the presenter computing device is operating in a second casting mode different than the first casting mode at the second time. Additionally, the instructions may cause the one or more processors to determine that the second action will not be reported in real-time to the target computing device based on at least the determination that the presenter computing device is operating in the second casting mode at the second time.

A method of casting electronic content, in accord with a second aspect of this disclosure, may include identifying, at a first time during a casting session, a first action performed by a user of a presenter computing device affecting rendering of a first electronic content item being casted to a first target computing device via the casting session. The method may also include determining that the presenter computing device is operating in a first casting mode at the first time. The method may further include, based on at least the determination that the presenter computing device is operating in the first casting mode at the first time, changing a rendering of the first electronic content item by the first target computing device by causing the first action to be reported in real-time to the first target computing device. In addition, the method may include identifying, at a second time during the casting session, a second action performed by the user affecting rendering of the first electronic content item, wherein the second time is different than the first time. Also, the method may include determining that the presenter computing device is operating in a second casting mode different than the first casting mode at the second time. Additionally, the method may include determining that the second action will not be reported in real-time to the target computing device based on at least the determination that the presenter computing device is operating in the second casting mode at the second time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 2A and 2B illustrate an example system configured to implement electronic content casting techniques described herein. FIG. 2A illustrates the system. FIG. 2B illustrates an example implementation of a teleconferencing service included in the system shown in FIG. 2A. FIG. 2C illustrates an example implementation of a participant computing device, such as the first participant computing device shown in FIGS. 1A and 1B, included in the system shown in FIG. 2A. FIG. 2D illustrates an example implementation of a casting target computing device, such as the first casting target computing device shown in FIGS. 1A and 1B, included in the system shown in FIG. 2A.

FIG. 3A shows an example of a user interface (UI) presented on a display of the first participant computing device, being used by the first attendee to initiate a casting session, as in FIG. A. FIG. 3B shows an example of a UI, relating to identification of candidate casting target computing devices, presented in response to an actuation of a UI control presented in FIG. 3A. FIG. 3C illustrates an example of the UI shown in FIG. 3B, in which the UI presents a casting target computing device listing showing the casting target computing devices identified for the first participant computing device. FIG. 3D illustrates an example of a UI presented by the first participant computing device for selecting an electronic content item for casting. FIG. 3E illustrates an example in which the selected electronic content item is being casted to the first casting target computing device, resulting in the system causing the selected electronic content item to be rendered by a native application 243a on a display of the first casting target computing device.

FIG. 4 illustrates an alternative approach to selecting the electronic content item for casting, in which a casting session is initiated from a native application being used to render the electronic content item.

FIGS. 5A and 5B illustrate another approach to selecting the electronic content item for casting, in which the electronic content item is selected from an electronic content listing in advance of selecting a candidate casting target computing device.

FIGS. 6A, 6B, and 6C illustrate examples in which a presenter performs an additional activity on the first participant computing device that changes a content of the display of the first participant computing device without changing rendering of the electronic content item by other endpoints of a casting session. In FIG. 6A, the display is being used to render the electronic content item on the first participant computing device as shown in FIG. 3E. FIG. 6B shows an example in which the additional activity is being performed in response to an actuation of a UI control in FIG. 6A. FIG. 6C shows a different example in which the display is being used for an additional activity while the casting session continues.

FIG. 7A illustrates examples of rendering an electronic content item on a display of the presenter device rendering the electronic content item on a display of the second casting target computing device. FIG. 7B shows an example in which the presenter has added a second content portion, resulting in the second casting target computing device rendering the second content portion via the casting session. FIG. 7C shows an example in which the presenter has to operating in a different casting mode than in FIG. 7B, in which the presenter device will not automatically generate and distribute various encoded actions. FIG. 7D illustrates an example in which, while continuing to operate in the casting mode of FIG. 7C, the presenter has further added a content portion and is also selectively choosing to cast this initially uncasted content portion. FIG. 7E illustrates the content portion of FIG. 7D having been casted to the second casting target computing device in response to the actuation of a cast selection UI control presented in FIG. 7D. FIG. 7F illustrates an example in which encoded navigation actions are not generated in response to operating in the casting mode of FIG. 7C.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated.

The term "casting" relates to a real-time document presentation, in which interactions between a presenting user ("presenter") and an electronic content (such as, but not limited to, a document created using a content creation application) via a first computing device are graphically rendered via one or more computing devices other than the first computing device. Conventionally, casting has involved the identification and transmission of pixel regions on a display of the first computing device (for example, pixel regions that have changed from previous frames) for graphical rendering by the one or more other computing devices. Instead of such pixel-based approaches, approaches described herein involve the use of native applications designed for the particular form of the electronic content (for example, use of a word processor application to render a word processing document, or use of a spreadsheet application to render to spreadsheet document) and configured to interpret and render the electronic content using computing resources of the computing devices on which the native applications are executed.

Figure 1A:
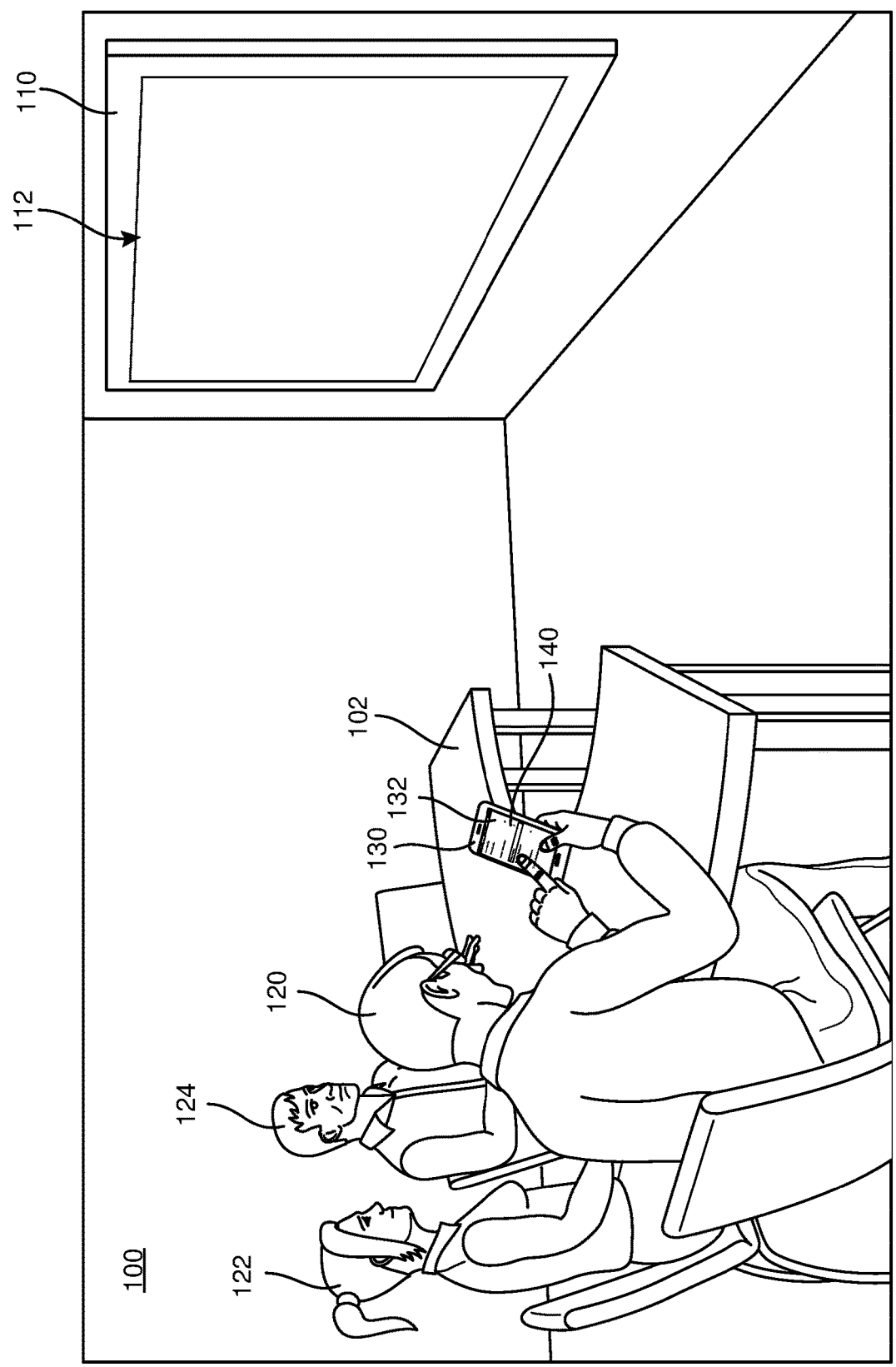
FIGS. 1A and 1B illustrate an example of an environment 100 in which a first attendee is initiating a casting session of an electronic content item from a first participant computing device to a first casting target computing device.
Figure 1B:
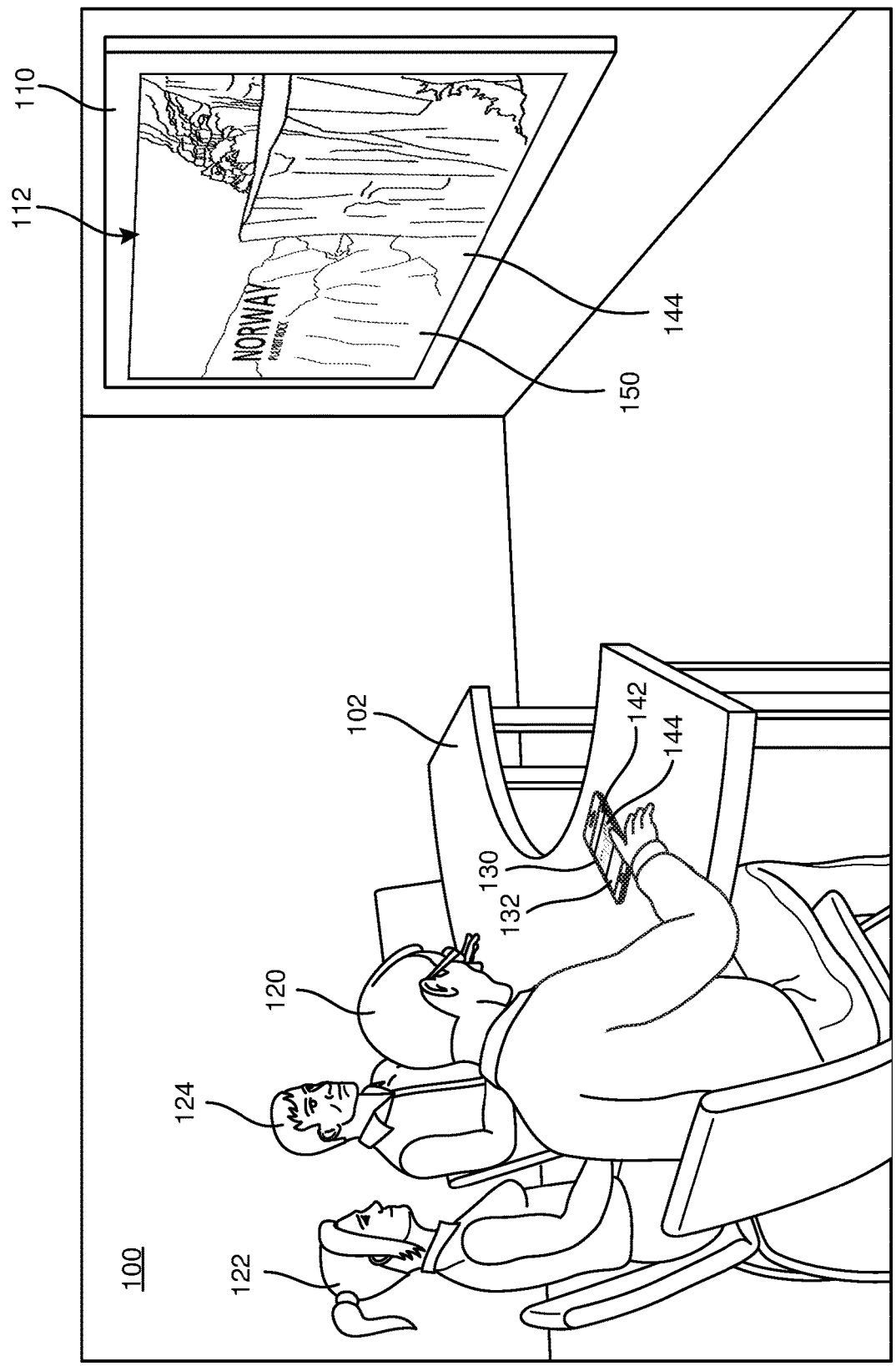

FIGS. 1A and 1B illustrate an example of a first environment 100 in which a first attendee 120 is initiating a casting session of a first electronic content item 144 (which may be referred to as an "electronic content" or "content") from a first participant computing device 130 (which may be referred to as a "participant device," "user computing device," or "user device") to a first casting target computing device 110 (which may be referred to as a "casting target device," "target device," or "casting target"). It is understood that a file or a document is an example of an electronic content item. In the example shown in FIGS. 1A and 1B, the environment 100 is a conference room with the first target device 110 and a table 102 permanently located therein. The first attendee 120 is seated at the table 102, as are a second attendee 122 and a third attendee 124. The attendees 120, 122, and 124 may be in the first environment 100 for a scheduled or unscheduled meeting together. In this particular example, the attendees 120, 122, and 124 are the only attendees of the meeting. At the time shown in FIG. 1A, a first display device 112 (which may be referred to as a "display") included in the first target device 110 is not being used in connection with the meeting. For example, the first target device 110 may be in a reduced power sleep state in which the display 112 is powered off. The display 112 offers a large display area well suited for viewing from a distance.

In FIG. 1A, the first attendee 120 wishes to display and discuss the first electronic content item 144, which is accessible via the first participant device 130 with the other attendees 122 and 124. In this example, the first participant device 130 is in a form of a handheld portable smartphone computing device, although the first participant device 130 may in embodied in other forms, such as, but not limited to, a tablet computer, a notebook or laptop computer, a desktop computer, and/or a console computing device (for example, a console provided on the table 102). The first participant device 130 includes a first native application configured to obtain and render the first electronic content 144 (for example, in a form of an electronic file stored in a local storage included in the first participant device 130 or retrieved from a network-accessible storage service) natively, by using computation resources included in the first participant device 130. However, although the first participant device 130 may be effective for individual use for viewing and/or editing the first electronic content 144, in the context of the meeting shown in FIGS. 1A and 1B it would be much more effective for the first electronic content 144 to be rendered via the first target device 110 for viewing by all of the attendees 120, 122, and 124. In FIG. 1A, the first attendee 120 is interacting with a first user interface (UI) 140 being presented on a display 132 included in the first participant device 130. Via the first UI 140, the first attendee 120 requests casting of the first electronic content 144 to the first target device 110.

In response to the interactions of the first attendee 120 with the first UI 140 in FIG. 1A, in FIG. 1B casting of the first electronic content 144 in a first casting session has begun, with the first attendee 120 being the "presenter" of the casting session. The first electronic content 144 (in this example, a slide deck for a presentation application such as Microsoft PowerPoint™) is rendered in a second UI 142 on the display 132 by a second native application (which may be the first native application) executing on the first participant device 130. At the same time and during the casting session for the first electronic content 144, the first electronic content 144 is rendered in a third UI 150 on the display 112 by a third native application executing on the first target device 110. By use of the third native application to render the first electronic content 144 on the first target device 110, the rendering resolution, quality, and capabilities are not rendered to those of the first participant device 130, the first native application, or the second native application, as would generally occur if casting were performed by "screencasting" graphical contents of the display 132; for example, screencasting resolution and/or quality might be significantly reduced by the first participant device 130 being in a portrait orientation instead of a landscape orientation.

During the casting session, actions performed by the attendee 120 that affect rendering of the first electronic content 144 on the first participant device 130 are identified, encoded, and transmitted by the first participant device 130. In response to receiving the encoded actions, the first target device 110 performs equivalent actions via the third native application, and as a result affects the rendering of the first electronic content 144 by the first target device 110 in parallel with the actions performed on the first participant device 130. The encoded actions may include navigation actions that change a subportion of the electronic content that is being rendered. For a slide deck rendered by a presentation application, navigation actions might include "next slide" (proceed to the slide or page immediately following a currently rendered slide or page), "previous slide" (proceed to the slide or page immediately preceding a currently rendered slide or page), and/or "go to page" (proceed to an arbitrary identified slide or page) actions. For some electronic content, navigation actions might include "scroll" actions for scrolling up or down through a view of the electronic content the extends beyond a currently displayed portion. The encoded actions may include editing actions that change portions of the first electronic content 144, such as, but not limited to, adding or removing text, adding, removing, resizing, and moving graphical components, and formatting actions (such as, but not limited to, character formatting and paragraph formatting). The encoded actions may include annotation actions such as, but not limited to, highlighting of components, inking, and presentation and/or movement of a visual pointer. In some examples, an annotation action is only applied during the rendering of the first electronic content 144 during the casting session and does not modify the first electronic content 144 itself. In some implementations, annotations may be rendered via an overlay UI, rather than by a native application. By modifying the rendering of the first electronic content 144 on the display 112 in response to received actions in real-time, the first target device 110 offers an engaging canvas for collaborative discussion of the first electronic content 144.

Figure 2A:
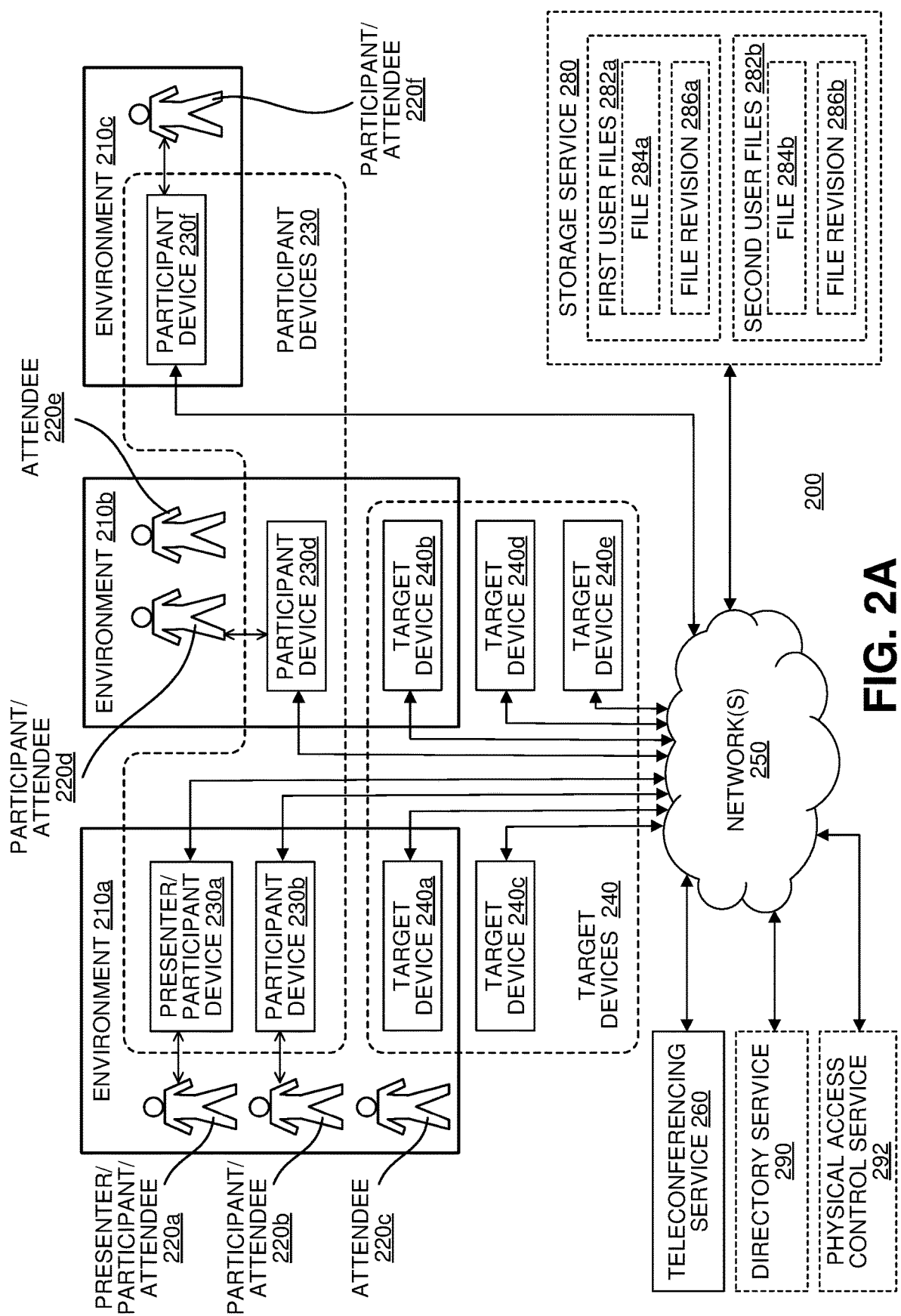

FIGS. 2A, 2B, 2C, and 2D illustrate portions of an example system 200 configured to implement electronic content casting techniques described herein. The example shown in FIGS. 2A and 2B may include any of the features described in connection with FIGS. 1A and 1B. FIG. 2A shows a plurality of attendees 220 located in various environments 210, including fourth attendee 220a, fifth attendee 220b, and sixth attendee 220c in a second environment 220a, seventh attendee 220d and eighth attendee 220e in a third environment 210b, and ninth attendee 220f in a fourth environment 210c. Additionally, there is a plurality of target devices 240, including a second target device 240a located in the second environment 210a, a third target device 240b located in the third environment 240b, and three target devices 240c, 240d, and 240e in various locations and environments.

Also, a portion of the attendees 220 is associated with respective participant devices 230, with attendees 220a, 220b, 220d, and 220f respectively associated with respective second participant device 230a, third participant device 230b, fourth participant device 230d, and fifth participant device 230f. While a participant device 230 is being used to participate in a teleconferencing session, the associated attendee 220 may also be referred to as a "user" of the system 200 and/or a "participant" of the teleconferencing session. Each of the environments 210a, 210b, and 210c may be considered "remote" to each other. For example, from the perspective of the fourth attendee 220a in the second environment 210a, the third environment 210b and the third target device 240b, the participant device 230d, and the attendees 220d and 220e are each "remote" to the attendee 220a; also, the second environment 210a and the second target device 240a, the participant devices 230a and 230b, and the attendees 220a, 220b, and 220c are each "local" to the fourth attendee 220a. It is understood that the numbers of elements, such as the number of attendees 220, the number of participants, the number of environments 210, number of participant devices 230, and the number of target devices 240, shown for the system 200 is merely an example, and that other numbers of such elements may be included in the system 200.

As shown in FIG. 2A, each of the participant devices 230 and the target devices 240 are configured to interact with a teleconferencing service 260 via one or more network(s) 250. It is understood that different devices 230 and 240 may communicate with the teleconferencing service 260 via different network arrangements, including different network technologies (for example, various devices 230 and 240 might make use of wired, mobile, satellite, and/or WiFi "last mile" network connections), different network operators, and geographically diverse networks (for example, the environments 210*a*, 210*b*, and 210*c* might be located in different countries and accordingly rely on different network segments).

FIG. 2B illustrates an example implementation of the teleconferencing service 260. The teleconferencing service 260 utilizes, and in some implementations manages, user data 261 for various user service accounts recognized by the teleconferencing service 260, including, in this example, first user data 262*a* for a first user service account associated with the fourth attendee 220*a*, second user data 262*b* for a second user service account associated with another one of the attendees 220, and further user data 261 for other user service accounts. In some implementations, the user data 261 includes organizational information for user service accounts, such as, but not limited to identifications of teams, groups, organizations, hierarchies, roles, and/or locations that have been associated with various users. In some implementations, the teleconferencing service 260 is configured to interact with a directory service 290, such as a service implementing Microsoft Active Directory services, to obtain organizational information for user service accounts.

The teleconferencing service 260 also includes a user authenticator 263 configured to perform credential-based authentication of computing devices (such as the participant devices 230) and/or software instances executing on the computing devices (such as a teleconferencing application 232 executed by an example participant device 230 shown in FIG. 2C) for user service accounts associated with the teleconferencing service 260. Accordingly, interactions between participant devices 230 and the teleconferencing service 260 are done in association with specific user service accounts, allowing the teleconferencing service 260 to perform authorization procedures on various casting-related operations, such as identifying target devices 240 that a user service account is permitted to use for casting. In some implementations, the user authenticator 263 supports the use of credentials obtained from external authentication services (for example, tokens issued by a single sign on (SSO) service), and may associate user account identifiers provided by such services with respective user service accounts in the user data 261. In some implementations, the user authenticator 263 is configured to issue an access token to a computing device that has successfully authenticated, and the teleconferencing service 260 is configured to receive and process the access token in later communications for authentication and authorization operations.

The teleconferencing service 260 maintains target device data 264 for various target devices 240 that have been registered with the teleconferencing service 260. In this example, the target device data 264 includes first target device data 265*a* associated with the second target device 240*a*, second target device data 265*b* associated with another one of the target devices 240, and further target device data 264 for other target devices 240. In some implementations, the target device data 264 includes organizational information for target devices 240, such as, but not limited to identifications of organizational entities such as, but not limited to users, roles, teams, groups, organizations, hierarchies, and/or locations that have been associated with various target devices 240. In some implementations, a target device 240 may be associated with an organizational entity; for example, a target device 240 may be associated with a particular floor to facilitate identifying candidate target devices for casting.

The teleconferencing service 260 may be configured to provide an administrative interface (not shown) for managing target device data 264 in order to establish and maintain desired usage policies for target devices 240. In some implementations, the teleconferencing service 260 is configured to interact with a directory service 290 to obtain and maintain organizational information for target devices 240. In some implementations, the teleconferencing service 260 includes a target device authenticator 266 configured to permit target devices 240 and/or software instances executing on the target devices 240 (such as a teleconferencing application 242 shown in FIG. 2D) to register their availability with the teleconferencing service 260 when they are available for use for casting. In some implementations, the target device authenticator 266 is configured to perform secure credential-based authentication of target devices 240.

In some implementations, the teleconferencing service 260 includes a proximity detector 267 configured to, based on at least one or more proximity signals received from participant devices 230 and/or target devices 240, identify which, if any, target devices 240 are, and/or likely are, in physical proximity to a particular participant device 230 and/or associated attendee 220. In some examples, this identification may be based on location information obtained from user data 261 and/or target device data 264. For example, a proximity signal (such as a wireless networking access point identifier) may be used to identify a floor of a building on which a proximity device 230 is located, and the proximity detector 267 may be configured to select identified target devices 240 based on the target device data 264 indicating they are located on the same floor. In some examples, the proximity detector 267 is configured to obtain and apply proximity signals from other systems, such as, but not limited to, a physical access control service 292 configured control and track physical access to a structure or a part of a structure. For example, based on a recent use of a physical access control device (for example, an RFID tag) by an attendee 220 to access a particular floor of a building, a proximity identification may be based on an assumed presence of that attendee at that floor. Device use activity for computing devices at known locations may be applied to similar effect. It is noted that in some implementations, the proximity detector 267 may be implemented in part or in whole by one or more participant devices 230, one or more target devices 240, and/or the teleconferencing service 260.

In some implementations, the teleconferencing service 260 includes a candidate target identifier 268 configured to identify target devices 240 that are currently candidate target devices for a participant device 230 to use for casting. In some implementations, the candidate target identifier 268 is configured to use the proximity detector 267 to identify target devices 240 that are currently in physical proximity and select some or all of the candidate target devices from those in physical proximity. However, in some examples there are circumstances in which a non-proximate target device 240 is identified as a candidate target device. In some implementations, a participant device 230 identifies particular target devices 240 for processing by the candidate target identifier 268. For example, an identifier obtained for a target device 240 (for example, based on a printed or displayed code) may be received from a participant device 230 for consideration as a candidate target device.

In some implementations, the teleconferencing service 260 includes user/target casting policies 269 storing policies identifying allowed and/or disallowed target device 240 for user service accounts. In some implementations, the user/target casting policies 269 includes whitelists and/or blacklists for particular organizational entities; for example, use of a particular target device 240 or group of target devices 240 for casting may be limited to user service accounts associated with specified teams or locations (such as a particular building or floor). The target identifier 268 may be configured to obtain and apply user/target casting policies 269 associated with a user service account and/or target device 240. The application of the user/target casting policies 269 may be based on user data 261, the target data 264, and or information obtained from the directory service 290.

The teleconferencing service 260 maintains and uses meeting session data 270 for currently active teleconferencing sessions and, in some examples, scheduled teleconferencing sessions. In FIG. 2B, the meeting session data 270 includes ad hoc session data 271 for unscheduled teleconferencing sessions. For example, an ad hoc session might be instantiated as part of establishing the casting session should in FIG. 1B. In some implementations, the teleconferencing service 260 supports scheduling sessions in advance, including scheduling a session, identifying a location, issuing attendee invitations, and/or identifying resources for a session, and maintains associated scheduled session data 272. For a session that is currently active, the meeting session data 270 may include information identifying current participants, current participant devices 230, whether the session has a casting component, which target devices 240 are being used to render the casting component, and a participant that is acting as the presenter for the casting component.

The teleconferencing service 260 includes a session manager 273 configured to instantiate and manage active teleconferencing sessions. The session manager 273 is configured to receive and respond to requests received from participant devices 230 and target devices 240, as well as issue commands to participant devices 230 and target devices 240. The session manager 273 is configured to instantiate and manage session components, such as, but not limited to, a casting component and audiovisual components (for example, the receipt and distribution of audiovisual streams from and to multiple endpoints). For a casting component, the session manager 273 is configured to identify (and in some examples, provide) an electronic content being casted, cause endpoints to render the electronic content using an associated native application, receive an action stream of encoded actions from a presenter device, and distribute the action stream to non-presenting rendering endpoints for modifying their renderings of the electronic content accordingly. In some examples, a session may be primarily limited to a casting component and not include, for example, an audiovisual component, as might be done for the example shown in FIG. 1B.

FIG. 2C illustrates an example implementation of a participant device 230, which may be used for any of the participant devices 230 shown in FIG. 2A. In this example, the participant device 230 is configured to be able to serve both as a presenter device that transmits encoded actions, and as a casting display endpoint that receives and responds to encoded actions generated by a presenter device. The participant device 230 includes a display 231, as illustrated by the display 132 of the participant device 130 shown in FIGS. 1A and 1B. The participant device 230 is also configured to execute a first teleconferencing application 232 that is configured to interact with the teleconferencing system 260 to perform casting. In some examples, the first teleconferencing application 232 is primarily directed to interacting with various functions available via the teleconferencing service 260, including casting. In some examples, the first teleconferencing application 232 is primarily directed to other functions, such as content creation, but is a "casting-aware" application capable of interacting with the teleconferencing service 260 for at least casting. For example, the first teleconferencing application 232 may be a content creation application that is able to perform casting of a currently open electronic content.

Whether being used as a presenter endpoint or casting display endpoint, the participant device 230 is configured to execute a native application 233a associated with an electronic content being casted for rendering the electronic content on the display 231. In some examples, multiple native applications 233, each configured to render respective content types, are available on the participant device 230, and the participant device 230 is configured to execute the native application 233 corresponding to the content type of an electronic content being casted. In some examples, a native application 233 is not configured to generate and/or process encoded actions for casting, and a native application interface 232a is used which is configured to interact with the native application 233 in order to generate and/or process encoded actions for casting. Although, as shown in FIG. 2C, the native application interface 232a may be implemented as part of the teleconferencing application 232, in some implementations the native application interface 232a may be implemented as a standalone application, a wrapper application, and/or a plugin component for the native application 233, and may be configured to interact directly with the teleconferencing service 260 for casting.

In some implementations, the participant device 230 may include one or more output device(s) 234 which a native application 233 is configured to use for rendering an electronic content. For example, rendering of an electronic content may result in an audio signal output by a loudspeaker included in the participant device 230.

In some implementations, the participant device 230 may include a proximity transceiver 235 (which may be configured, in various example, to sense proximity-indicating signals, generate proximity-indicating signals, or sense and generate proximity-related signals) and the system 200 (for example, via the teleconferencing application 232) is configured to utilize the proximity transceiver 235 to generate proximity-indicating signals and/or process sensed proximity-indicating signals. In some examples, the proximity transceiver 235 (a portion of which may be implemented by the teleconferencing application 232) is configured to provide proximity signals, reflecting proximities between participant devices 230 and target devices 240, to the teleconferencing service 260 (for example, via the teleconferencing application 232) for use by the proximity detector 267. An example proximity-indicating signal is a short-range radio transmission, such as, but not limited to, a Bluetooth transmission or a near-field communication (NFC) transmission, indicating the presence of a casting-enabled device. Another example of a proximity-indicating signal is a wireless access point identifier (such as, but not limited to, a Service Set Identifier (SSID) or a media access control (MAC) address). For some proximity-indicating signals, the proximity transceiver 235 can also provide measurement-based proximity signals based on measurements such as, but not limited to, a received strength of a signal (such as, but not limited to, an RSSI value) and/or a noise level (such as, but not limited to, a signal-to-noise (SNR) value). The proximity transceiver 235 may be configured to not provide a proximity signal for a proximity-indicating signal where such a measurement does not satisfy a threshold condition (for example, a minimum RSSI threshold value). The proximity transceiver 245 may be configured to generate a proximity signal based on a successful decoding, decryption, and/or verification (for example, using a cryptographic hash) of a data content of a received proximity-indicating signal. For some proximity-indicating signals, the proximity transceiver 245 may be configured to provide an estimated degree of proximity (for example, based on an RSSI value).

The participant device 230 includes one or more input device(s) 236 such as, but not limited to, a keyboard and/or a pointer device (for example, a mouse or trackpad). When the participant device 230 is operated as a presenter device, the participant device 230 (for example, via a native application 233 rendering an electronic content) may respond to various user inputs received from a user via the input device(s) 236, resulting in associated encoded actions being generated. For example, keyboard input may result in text being added to a casted electronic content on a presenter device, corresponding encoded actions being provided to a target device 240, and the target device 240 updating its rendering of the electronic content to include the added text. When the participant device 230 is operating as a casting display endpoint, in some examples a participant can interact asynchronously with a casted electronic content via user inputs submitted via the input device(s) 236. For example, the participant may navigate to other portions of a document and/or may make independent changes to a document.

In some examples, the participant device 230 includes a local storage 237 such as, but not limited to, a hard drive or flash memory device. In some examples in which the participant device 230 is operating as a presenter device, an electronic content, before being selected for casting, is stored as a local file 238 in the local storage 237; for example, as a file 238 created by a content creation application executed on the participant device 230. In such examples, the process of casting the electronic content includes distribution of the locally stored file 238 to any other endpoints rendering the electronic content during a casting session. In some examples, a participant may make an edit to a first electronic content while it is being casted to the participant, and in response to a detection of the edit the system 200 may be configured to create a second electronic content item different than the first electronic content item and reflecting the edit having been applied to the first electronic content item. For example, the second electronic content item may be stored locally as a file revision 239 in the local storage 237. This allows the participant to retain the edits, which may include notes taken by the participant during a casting session, after the casting session is completed.

FIG. 2D illustrates an example implementation of a target device 240, which may be used for any of the target devices 240 shown in FIG. 2A. The target device 240 includes a display 241, as illustrated by the display 112 of the target device 110 shown in FIGS. 1A and 1B. The target device 240 also includes a teleconferencing application 242 and native application 243a, which may be configured much as described respectively for the teleconferencing application 232 and native application 233a of the participant device 230 in FIG. 2C. However, the teleconferencing application 242 is configured to interact with the teleconferencing service 260 as a target device 240 (for example, by authenticating with the teleconferencing service 260 via the target device authenticator 266). In various implementations, the target device 240 may include a native application interface 242a, multiple native applications 243, output device(s) 244, and/or a proximity transceiver 245, which may be configured much as described respectively for the native application interface 232a, native applications 233, output device(s) 234, and proximity transceiver 235 of the participant device 230 in FIG. 2C.

Referring back to FIG. 2A, in some implementations the system 200 includes, or is configured to interact with, a storage service 280 configured to store and provide files to the participant devices 230 and target devices 240 via the network(s) 250. In some examples, the storage service 280 maintains files in connection with user accounts. For example, in FIG. 2A the storage service 280 maintains first user files 282a in connection with a first user account associated with the attendee 230a, including a file 284a and a file revision 286a, and maintains second user files 282b is connection with a second user account associated with another one of the attendees 230, including a file 284b and a file revision 286b. In some implementations, the storage service 280 supports token-based access, allowing access to a file or set of files to a computing device presenting an associated token. In some examples, a token may only provide read-only access to a file or set of files. In some examples, a presenter selects an electronic content maintained in the storage service 280 for casting, resulting in generation and distribution of an associated token (or tokens) to casting endpoints for access and retrieval of the electronic content from the storage service 280 by each endpoint. In some implementations, both the teleconferencing service 260 and the storage service 280 support the use of the same credentials obtained from external authentication services (for example, tokens issued by a SSO service), and may associate user account identifiers provided by such services with respective user service accounts of the teleconferencing service 260 and user accounts of the storage service 280, thereby simplifying access of the system 200 to files maintained by the storage service 280.

FIGS. 3A-6B illustrate further examples involving the first environment 100 shown in FIGS. 1A and 1B. In the discussions of FIGS. 3A-6B, the first environment 100, the first target device 110, the first participant device 130, and the attendees 120, 122, and 124 respectively correspond to the second environment 210a, the second target device 240a, the second participant device 230a, and the attendees 220a, 220b, and 220c shown in FIG. 2A. Accordingly, the first participant device 130 and the first target device 110 are described as interacting with the teleconferencing service 260 and other features shown and described in FIGS. 2A and 2B. Additionally, the first participant device 130 includes the features shown and described in FIG. 2C and the first target device 110 includes the features shown and described in FIG. 2D.

Figures 3A, 3B:
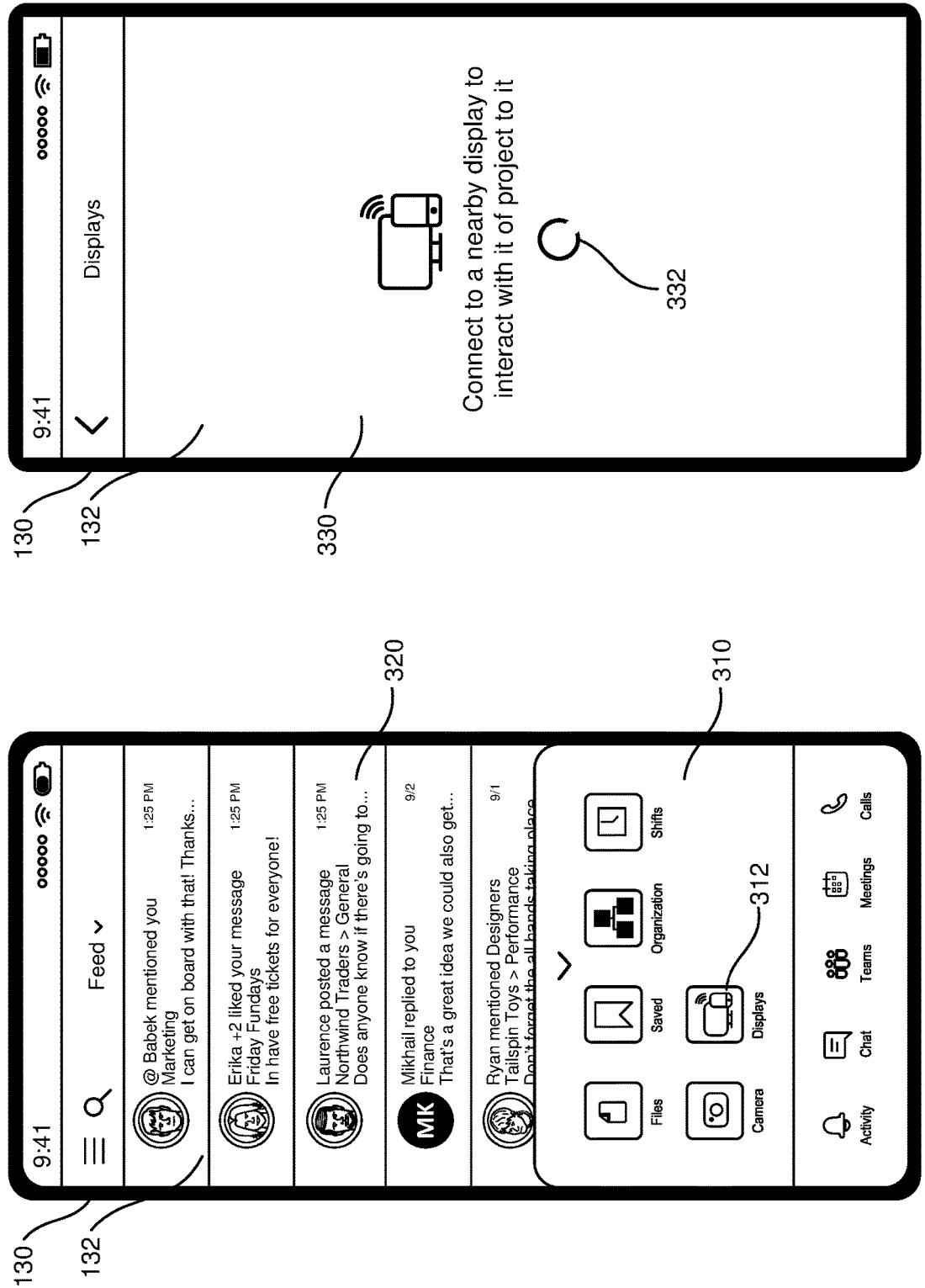
FIGS. 3A, 3B, 3C, 3D, and 3E illustrate further details of the initiation of the casting session shown in FIGS. 1A and 1B.

FIGS. 3A, 3B, 3C, 3D, and 3E illustrate further details of the initiation of the casting session shown in FIGS. 1A and 1B. FIG. 3A shows an example of a fourth UI 310 presented on the display 132 of the first participant device 130, being used by the first attendee 120 to initiate a casting session, as described for the first UI 140 in FIG. A. In some examples, the fourth UI 310 may be presented by the teleconferencing application 232 executing on the first participant device 130. In this example, the teleconferencing application 232 is also displaying a fifth UI 320, displaying an activity feed provided by the teleconferencing service 260 and which was used to initiate the presentation of the fourth UI 310. Among other items, a first UI control 312 is provided in the fourth UI 310 for initiating the casting session.

FIG. 3B shows an example of a sixth UI 330 presented in response to an actuation of the first UI control 312 in FIG. 3A. In this example, the sixth UI 330 is being presented by the teleconferencing application 232, and includes a first UI indicator 332 that is being presented to indicate that the system 200 is identifying candidate target devices available to the first participant device 130 at the time shown in FIG. 3B. In various implementations, the identification of the candidate target devices is performed in whole or in part by the first participant device 130, the teleconferencing service 260, the first target device 110, and/or other target devices 240. Techniques described in connection with the candidate target identifier 268 in FIG. 2B may be applied.

With the system 200, a previous explicit one-to-one pairing of the first target device 110 with the first participant device 130 or the first attendee 120 (such as, for example, a user service account maintained by the teleconferencing service 260) preauthorizing use of the first target device 110 for casting from the first participant device 130 does not need to have been performed in advance. This allows various target devices 240 to be viewed and used as shared or open devices that are readily available for on-demand casting. In some implementations, the system 200 is configured to identify the candidate target devices based on correspondence(s) between an organizational information obtained for the user service account under which the first participant device 130 has been authenticated with the teleconferencing service 260 and organizational information obtained for the target devices 240 (including the first target device 110). In some examples, this correspondence may be determined based on the user/target device casting policies 269, much as described in FIG. 2B. For example, certain target devices 240 may be unavailable for use in casting by the first participant 120 due to those target devices 240 not fulfilling the user/target device casting policies 269 in combination with the first attendee 120.

In some implementations, the identification of the candidate target devices may be restricted, at least in part, to a subset of the target devices 240 that is determined by the system 200 to be, or likely to be, in physical proximity to the first participant device 130 and/or the first attendee 120. For example, techniques described in connection with the proximity detector 267 in FIG. 2B, the proximity transceiver 235 in FIG. 2C (included in the first participant device 130), and/or the proximity transceiver 245 in FIG. 2D (included in the first target device 110) may be applied.

In some examples, the system 200 is configured to identify physically proximate target devices by multiple different techniques (which may be individually available based on whether associated proximity signals applied by a given technique are available for particular devices), determine that multiple proximity detection techniques are available in connection with a participant device 230 and/or attendee 220, and prioritize or otherwise preferentially apply one or more of the available proximity detection techniques based on their granularity or range. For example, if the available proximity detection techniques were to include, for a participant device 230, a first technique identifying first proximate target devices in a same building (for example, based on physical access control records), a second technique identifying second proximate target devices on a same floor of the building (for example, based on WiFi access point access records), a third technique identifying third proximate target devices within range of short-range radio transmissions (for example, via Bluetooth signals), and a fourth technique identifying fourth proximate target devices in a same room (for example, via an acoustic signal), the system 200 may select the fourth proximate target devices or both the third and fourth proximate target devices based on the shorter higher granularity and/or shorter range of their associated techniques versus the other techniques. In some examples, a target device 240 may be included and/or ranked in the candidate target devices based on a measurement-based proximity signal for the target device 240 and/or an estimated degree of proximity between the target device 240 and a participant device 230.

In some examples, in response to obtaining an identifier for a target device 240 (obtained from, for example, a printed code located on or near the target device 240 or a code displayed by the target device 240) from a participant device 230, the system is configured to determine that the participant device 230 and the target device 240 are in proximity at that time. In some implementations, the system 200 is configured to automatically include a target device 240 as a candidate target device in response to an identifier for the target device 240 having been obtained by a participant device 230 at about the same time.

In some implementations, the system 200 is configured to, determine that an attendee 220 (based on an associated user account) associated with a participant device 230 is scheduled to attend an event at a location identified for the event (for example, in a location field of a record for the event) at or about a current time (based on, for example, a scheduled session record 272 or an electronic calendar record) and/or the attendee 220 is determined to be participating in the event (for example, for an attendee 220 who joins a session without an advance invitation), and in response to that determination include one or more target devices 240 at the identified location (determined based on, for example, the target device data 264) as identified candidate target devices. For example, if an attendee 220 is participating in a scheduled session with a corresponding scheduled session record 272 identifying a first conference room as a location for the scheduled session, a target device 240 identified as being located in the first conference room would be included as a candidate target device. The system 200 may do this for an attendee 220 who is not actually at the identified location, which would allow a remote attendee to readily cast to a target device 240 at the identified location to facilitate viewing of the casted content by other attendees of the session who are at that location.

In some implementations, the system 200 is configured to include in the candidate target devices for an attendee 220 of a session (or an participant device 230 being used by the attendee) one or more target devices 240 identified as, or that would be identified as, candidate target devices for another attendee 220 of the session (or a participant device 230 being used by the other attendee). For example, in a session including the first attendee 220a (using the second participant device 230a) in the second environment 210a and the fifth attendee 230d (using the fourth participant device 230d) in the third environment 210b, candidate target devices identified for the participant 230a may include both the second target device 240a (for example, based on proximity to the second participant device 230a) and the third target device 240b (which would be a candidate target device for the fourth participant device 230d based on, for example, its proximity to the fourth participant device 230d). This allows an attendee 220 to readily cast to a target device at a remote locations to facilitate viewing of the casted content by another attendee 220 at that remote location.

In some examples, the system 200 is configured to not include a target device 240 in the candidate target devices based on a determination by the system 200 that the target device 240 is currently being used for casting or another function.

In some implementations, the system 200 is configured to, without having received a request to initiate an casting session from a participant device 230, automatically identify when a candidate target device is available for the participant device 230 and cause an indication of a candidate target device being available to be presented by the participant device 230. In some examples, the causing of the indication to be presented may be based on a determination that there are multiple attendees 220 present in the same environment 210 as the participant device 230, as this may represent a circumstance where casting would make it easier to discuss an electronic content among multiple attendees 220. In some examples, the causing of the indication to be presented may be based on a determination of a type of environment 210 in which the participant device 230 is located. For example, a conference room may be considered a more discreet environment 210 for casting than a more public environment 210, even if that environment 210 also has a target device 240 available for casting.

Figures 3C, 3D:
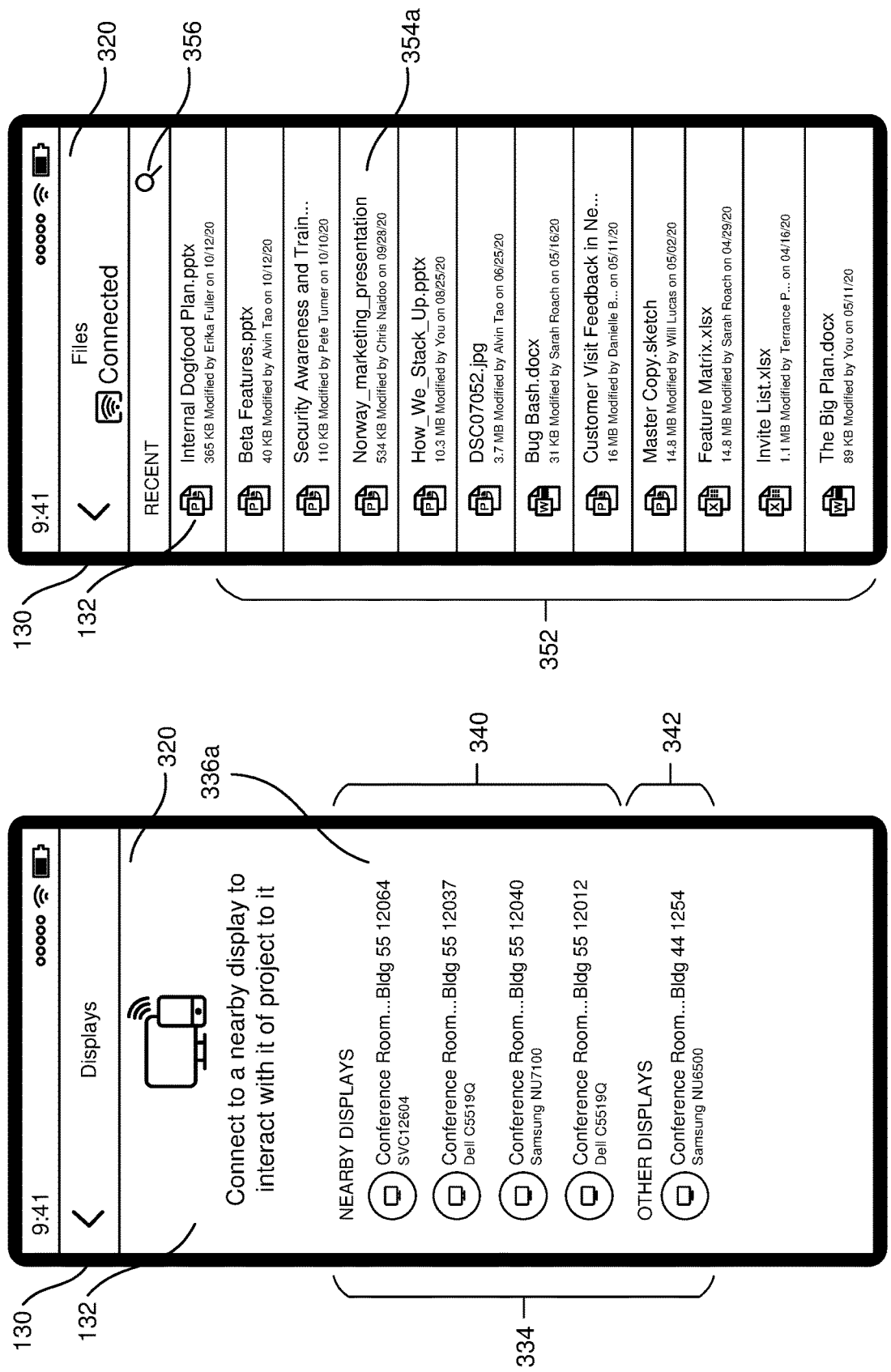

FIG. 3C illustrates an example of the sixth UI 330 shown in FIG. 3B, in which the sixth UI 330 presents a candidate target device listing 334 showing the candidate target devices identified for the first participant device 130, as discussed above. The candidate target device list 334 includes one or more target device selection UI controls, including a first target device selection UI control 336. In some implementations, the system 200 is configured to arrange the target device selection UI controls according to an estimated degree of proximity and/or techniques by which they were identified as candidate target devices. In the example shown in FIG. 3C, the candidate target device listing 334 is visually divided into a first portion 340 presenting candidate target devices determined to be in physical proximity to the first participant device 130 and a second portion 342 presenting candidate target devices identified by other means (for example, identified as in proximity to a remote attendee). In this example, the first portion 340 is ordered according to an estimated degree of proximity of each candidate target device, with the first target device selection UI control 336 corresponding to the candidate target device estimated as the most proximate to the first participant device 130. Through such arrangements of the candidate target device listing 334, the first participant 120 is more readily able to select a desired target device 240 for the casting session. In this example, actuation first target device selection UI control 336 results in selection of the corresponding target device 240 for the casting session and continuation of initiation the casting session. In some implementations, multiple target device selection UI controls may be concurrently selected using the sixth UI control 330, resulting in multiple target devices 240 being used concurrently as casting display endpoints for the casting session.

Depending on the circumstances in which the first participant 120 is initiating the casting session, the first participant 120 may need to select an electronic content item for casting. FIG. 3D illustrates an example of a seventh UI 350 presented by the first participant device 130 (for example, via the telecommunication application 232) for selecting the electronic content item for casting. In various examples, the seventh UI 350 may be presented before or after the sixth UI 330. In the example shown in FIG. 3D, the seventh UI 350 includes a recent content listing 352 presenting a plurality of electronic content items identified by the system 200 as having been recently accessed by the first participant 120 as respective content selection UI controls 354 corresponding to a respective electronic content item, including a first content selection UI control 354a corresponding to a first electronic content item. In some examples, as shown in FIG. 3D, a content search UI control 356 is included in the seventh UI 350, offering another UI (not shown) for searching for an electronic content item (for example, by filename and/or content). In this example, actuation of a content selection UI control 354 results in selection of the corresponding electronic content item for the casting session and continuation of initiation the casting session. The example of the seventh UI 350 shown in FIG. 3D is merely illustrative and not intended to be limiting on how the first participant 130 identifies the electronic content item for casting. For example, on a notebook computer, a file browser UI component may be more efficient. As another example, a voice-driven digital assistant may be used to select the electronic content item for casting.

In some implementations, if the electronic content item for casting is selected in advance, a content type of the selected electronic content item may be used to identify candidate target devices. For example, in response to a target device 240 not natively supporting rendering of the content type, the target device 240 may be excluded from the identified candidate casting targets. In some examples, if a target device 240 is selected in advance of the electronic content item, and the selected target device 240 does not natively support rendering of a content type of the selected electronic content item, the first participant device 130 may request selection of a different target device 240.

Figure 3E:
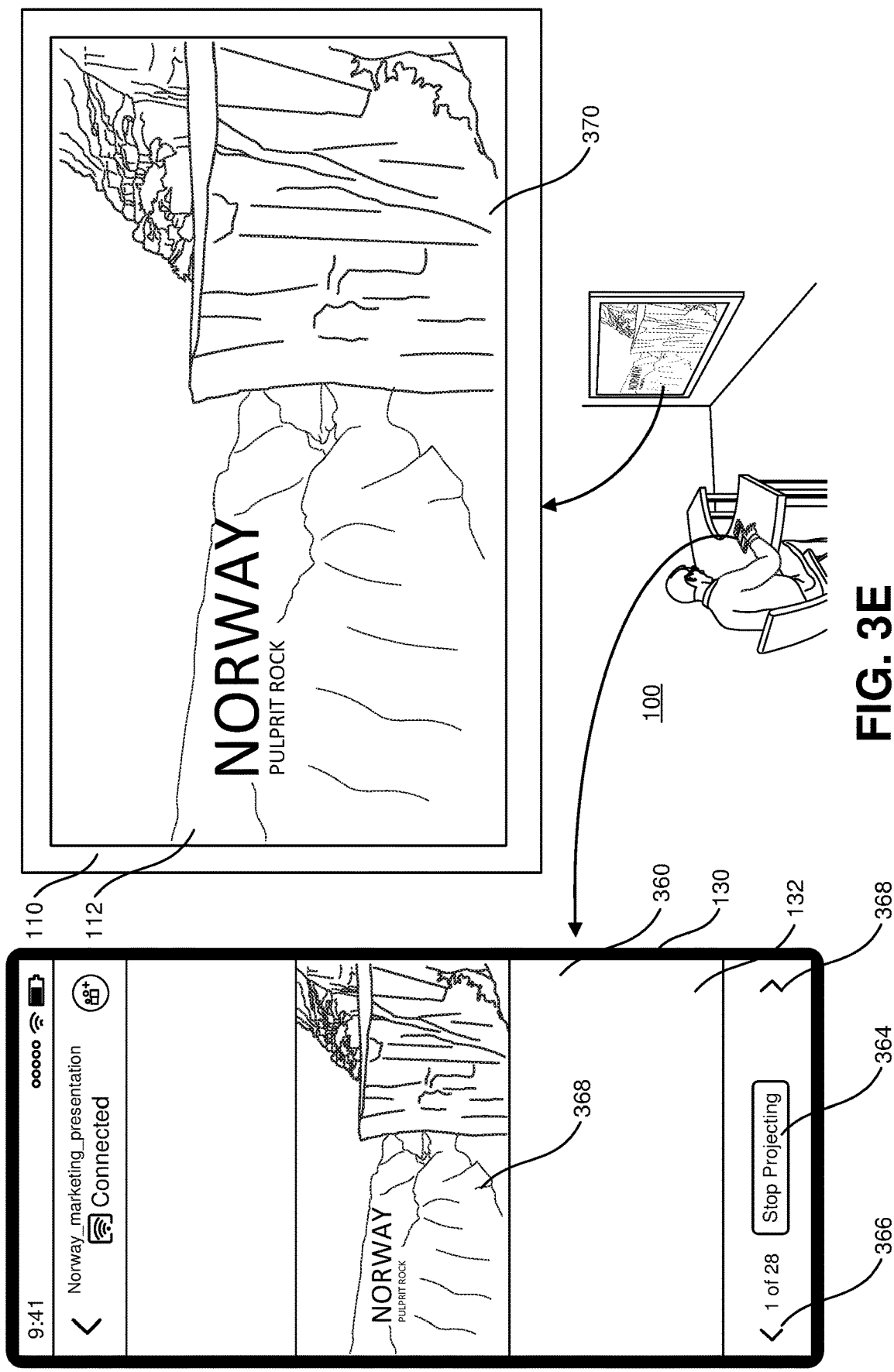

In response to an identification of a target device 240 and an electronic content item for the casting session (for example, via the sixth UI 330 and the seventh UI 350, although in some examples the target device 240 and/or the electronic content item may be implicitly identified by the system 200), the system 200 begins rendering of the selected electronic content item on the selected target device(s) 240. FIG. 3E illustrates an example in which an electronic content item 370 is being casted to the first target device 110, resulting in the system 200 causing the electronic content item 370 to be rendered by the native application 243a on the display 112 of the first target device 110. The first target device 110 is configured to make real-time changes to the rendering of the electronic content item 370 in response to actions performed at, and reported by, the first participant device 130. For the casting session, the system 200 is also configured to cause the electronic content item 370 to be rendered in a ninth UI 360 on the display 112 of the first participant device 130 (which is serving as the presenter device for the casting session at the time shown in FIG. 3E). In some implementations, the native application 233a renders the electronic content item 370 on the presenter device. However, in some examples, other approaches may be used for rendering the electronic content item 370 on the presenter device 370 such as, but not limited to, rendering by the teleconferencing service 260, another network-accessible service, and/or the target device 110.

The system 200 configures each of the endpoint devices for the casting session (in the example shown in FIG. 3E, the presenter device 130 and the target device 110) to obtain and render the electronic content item 370. In an example in which the electronic content item 370 is stored in the local storage 237 of the presenter device 130 before the casting session as the local file 238, the system 200 is configured to cause the local file 238 to be distributed to, and rendered by, the other endpoints of the casting session. In an example in which the electronic content item 370 is stored in the storage system 280 as the remote file 284a, the system 200 is configured to cause the remote file 284a to be obtained by all of the endpoints of the casting session. For example, a universal resource identifier (URI) for the remote file 284a may be provided by the system 200 to the endpoints, along with a token allowing each endpoint to access the remote file 284*a*.

The system 200 is configured to instantiate, maintain, and control the casting session via network-based interactions between the presenter device 130 and the teleconferencing service 260, and network-based interactions between the target device 110 (and other casting rendering endpoints) the teleconferencing service 260. For example, encoded actions generated by the presenter device 130 in response to actions of the first participant 120 via the presenter device 130 are received by the teleconferencing service 260 and distributed as encoded action streams to the casting rendering endpoints. In some examples, this may be implemented in a similar manner that audiovisual streams are received and distributed by the teleconferencing service 260 for sessions including audiovisual components. With this approach, there is no peer-to-peer networking or an associated "same network" requirement for the presenting device 130 and the target device 110, as coordination of, and communications for, the casting session is provided by the teleconferencing service 260. It also allows more flexibility and diversity in network connections for endpoint devices, and also allows more flexibility and diversity in the availability and selection of candidate target devices by a presenting device, as network architecture limitations are removed.

In some examples, the native applications 233 and 243 are full-featured content creation applications suitable for creating new content items, such as, but not limited to, Microsoft Word, Microsoft Excel, and Microsoft PowerPoint. In some examples, the system 200 is configured to operate a native application 233 or 243 in a "casting mode." In some examples, a native application 233 or 243, in response to operating in the casting mode, presents a limited UI, presenting fewer distracting UI elements in rendering the electronic content item 370. In some examples, the native application 233 or 243 permits an attendee 220 to dynamically switch between the limited UI and a more full-featured UI allowing, for example, editing of the electronic content item 370. In some examples, a native application 233 or 243, in response to operating in the casting mode, the native application 233 or 243 is configured to detect actions that affect rendering of the electronic content item 370 and encode the detected actions for distribution via the casting component of the session. In some examples, a native application 233 or 243, in response to operating in the casting mode, the native application 233 or 243 is configured to change its rendering in response to encoded actions received from the conferencing service 260 (for example, in an encoded action stream). By use of a native application 233 or 243 for rendering the electronic content item 370, the electronic content item 370 may be rendered according to the capabilities and features of each endpoint device.

Additionally, in some examples a participant 220 (for example, a presenting participant or a non-presenting participant) may, via a native application 233 or 243, freely navigate to selected portions of the electronic content item 370 and/or make an edit to the electronic content item 370. The system 200 may be configured to detect the edit to the electronic content item 370 while it is being casted to the participant 220, and in response to this detection the system 200 may be configured to create a new electronic content item different than the electronic content item 370 and reflecting the edit having been applied to the electronic content item 370. For example, the new electronic content item may be stored as a local file revision 239 or a remote file revision 286*b*. In an example in which a non-presenting participant 220 has navigated to a different portion of the electronic content item 370 than the presenter 130, the system 200 may be configured to present a UI control to the non-presenting participant 220 that returns the rendering of the electronic content item 370 to the same portion as the presenter 130. Thus, the non-presenting participant 220 is able to freely review and/or edit other portions of the electronic content item 370 and readily resynchronize with the presenter 130.

In some implementations, the system 200 may make use of document type specific, application type specific, and/or application specific sets of actions and/or encodings of actions. For example, information that needs to be conveyed to synchronize rendering for the application(s) in question may be first defined. Then, a data structure or other means of representing that information may be created, as well as any additional information needed for full response to an encoded action by a content rendering endpoint. The information to be conveyed may depend on the application and type of content in question. For example, for a presentation document (for example, a PowerPoint document), a current slide number and a current animation step may be needed for rendering by an endpoint to follow a presenter's navigation through, and interaction with, the document. Similarly, in a word processing document, a page/paragraph/line currently being presented by the presenter may be included in an encoded navigation action. After determining information to be conveyed in encoded actions, an implementer may determine how to represent this information. The information may be modeled as a data structure, but it may also be represented in another form. A presenter device and casting rendering endpoints need to be capable of creating and consuming the encoded actions respectively. As a presenter device detects the occurrence of new actions, it generates corresponding encoded actions that are sent by the presenter device to the teleconferencing service 260 and subsequently to the casting rendering endpoints, which respond accordingly to the encoded actions to change the rendering of the electronic content item 370. In many cases, the communication of these encoded actions consumes less network bandwidth than is demanded by a conventional bitmap-based conventional approach to casting.

In some implementations, where the presenter device 130 is not already joined to a teleconferencing session via the teleconferencing system 260, the teleconferencing system 260 is configured to instantiate the casting session much as it instantiates ad hoc teleconferencing sessions including audiovisual components, but as a session limited to a casting component with the presenter device 130 and the target device 110 as endpoints for the casting component. Where the target device 110 is not already joined to the teleconferencing session via the teleconferencing system 260, the system 200 is configured to join the target device 110 to the teleconferencing session. With the teleconferencing system 260 already having instantiated a teleconferencing session, it is simpler to move from this session limited to a casting component between two endpoints to joining a remote participant 220 to the session and adding audiovisual components to the session that allow communication between the local and remote environments 110 via the facilities provided by the teleconferencing system 260. In such implementations, the same ad hoc session continues to be used by the teleconferencing system 260.

In some examples, the system 200 is configured to support having multiple participants 220 in a casting session, and is also configured to fluidly change the presenter from one participant 220 to another participant 220. In some examples, although initially the presenter device was local to the target display 110, as a result of changing to a different participant 220 as the presenter a participant 220 remote to the target device 110 may be generating the encoded actions to which the target device 110 is responding. Since a native application 233 at a participant device 230 has a full native state of the electronic content item 370 being casted, a handover of the presenter role from one participant 220 to another participant 220 can occur without interruption to the casting session. Additionally, as each endpoint is natively rendering the electronic content item 370 instead of displaying pixel regions collected from the presenter device, a difference in rendering appearance between one presenter device to the next (for example, due to differences in screen resolution) does not change the rendering of the electronic content item 370 by other endpoints.

FIG. 4 illustrates an alternative approach to selecting the electronic content item 370 for casting, in which a casting session is initiated from a native application 233 being used to render the electronic content item 370. In the example shown in FIG. 4, the native application 233 renders the electronic content item 370 on the display 132 in a tenth UI 410. Much as previously discussed in FIG. 3B, in some implementations the system 200 is configured automatically identify when a candidate target device is available for the participant device 130, and in response to determining the candidate target device is available cause the participant device 130 to present a first casting initiation UI control 420 in the tenth UI 410. In some examples, the first casting initiation UI control 420 also presents a visual indication that the system 200 has determined that a candidate target device is available for the participant device 130. In response to an actuation of the first casting initiation UI control 420, the electronic content item 370 being rendered in the tenth UI 410 is selected for casting, and a process of initiating a casting session continues; for example, as shown in FIG. 3A and/or 3B (for example, if the participant 120 might select from multiple candidate target devices). In some examples, the native application 233 rendering the electronic content item 370 in FIG. 4 is also used for rendering the electronic content item 370 during the casting session.

FIGS. 5A and 5B illustrate another approach to selecting the electronic content item 370 for casting, in which the electronic content item 370 is selected from an electronic content listing 512 in advance of selecting a candidate target device. In FIG. 5A, an eleventh UI 510 is being presented on the display 132 (for example, by the teleconferencing application 232). In this example, the eleventh UI 510 includes a recent content listing 512 similar to the recent content listing 352 including in the seventh UI 350 in FIG. 3D. The recent content listing 512 includes a plurality of content selection UI controls 514 each corresponding to respective electronic content item and including a respective content action UI control 516 for preforming an action involving the electronic content item, as shown by a first content selection UI control 514*a* including a first content action UI control 516*a*.

FIG. 5B illustrates an example twelfth UI 520 presented on the display 132 in response to an actuation of the first content action UI control 516*a* shown in FIG. 5A. The twelfth UI 520 includes an content name 522 for the electronic content item corresponding to the content selection UI control 514*a* including the actuated first content action UI control 516*a* and a content item action list 524 including a second casting initiation UI control 526 that operates much as previously described for the first casting initiation UI control 420 in FIG. 4.

Figures 6B, 6C:
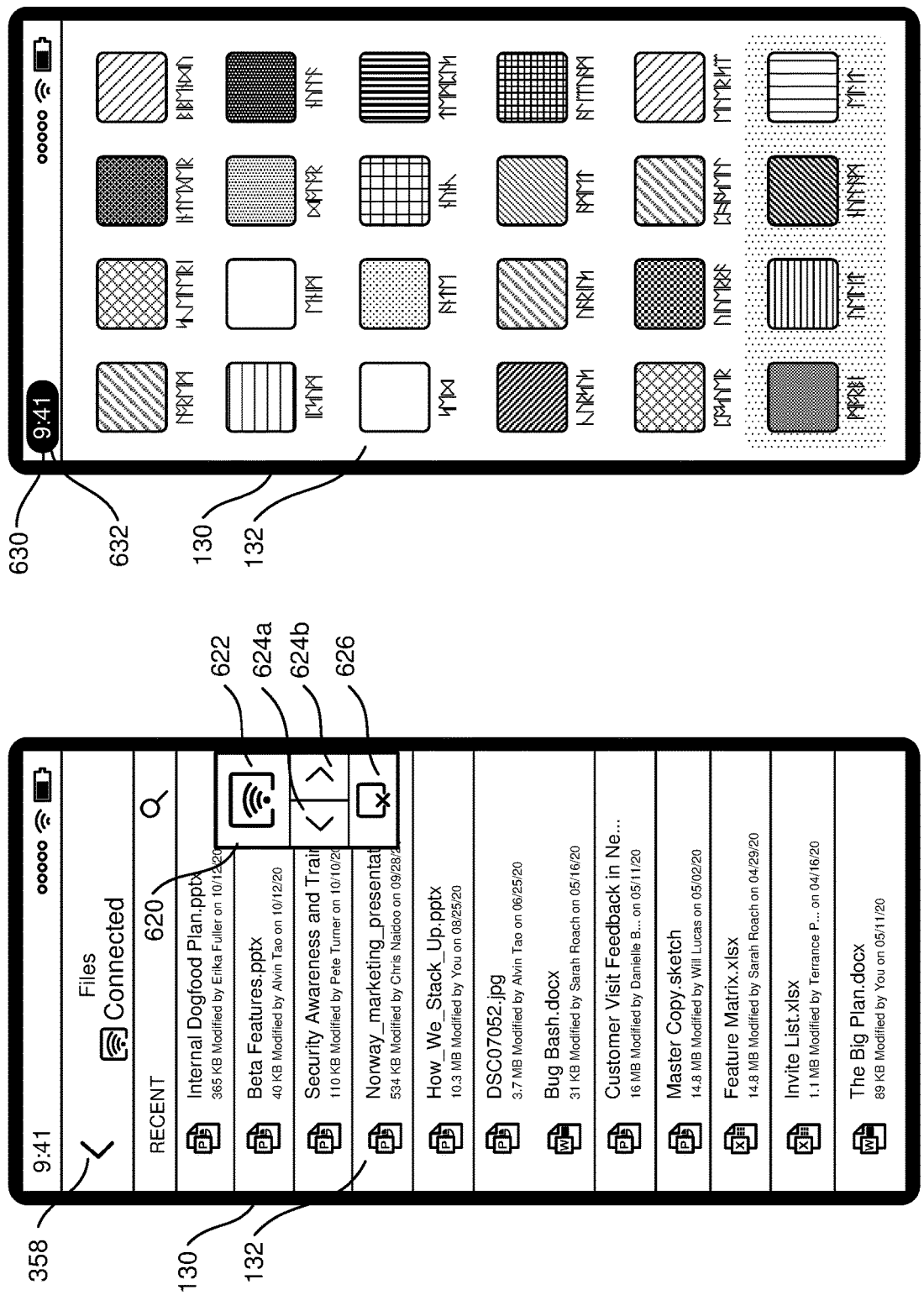

FIGS. 6A, 6B, and 6C illustrate examples in which the presenter 120 performs an additional activity on the presenter device 130 that changes a content of the display 132 of the presenter device 130 without changing the rendering of the electronic content item 370 by other endpoints of the casting session. In FIG. 6A, the display 132 is being used to render the electronic content item 370 in the ninth UI 360 as shown in FIG. 3E. In this example, the ninth UI 360 includes a UI control 610. In response to an actuation of the UI control 610, the presenter device 130 begins to perform the additional activity.

FIG. 6B shows an example in which this additional activity is being performed in response to an actuation of the UI control 610 in FIG. 6A. In this example, the additional activity involves the teleconferencing application 232 presenting the seventh UI 350 for electronic content item selection shown in FIG. 3D. In this example, the seventh UI 350 includes a UI control 358, which may be actuated to navigate to a different UI provided by the teleconferencing application 232. The rendering of the electronic content item 370 has changed (in this example, the electronic content item 370 is not being rendered on the display 132), but the casting session is not interrupted. The presenter device 130 is configured to, while the casting session is active, present a casting session UI control 620 allowing the presenter 120 to perform one or more operations in connection with the casting session, and also to provide a visual indication that the casting session remains active. In the example shown in FIG. 6E, the casting session UI control 620 includes a casting return UI control 622, and the presenting device 130 is configured to, in response to an actuation of the casting return UI control 622, return to the ninth UI 360 as shown in FIG. 6A. In some examples, casting session UI control 620 may include one or more casting navigation UI controls 624, and the presenting device 130 is configured to, in response to an actuation of a casting navigation UI control 624, transmit an associated encoded navigation action for the casting session (and, in some circumstances, perform the associated navigation action for the rendering of the electronic content item 370 by the presenter device 130). Accordingly, the presenter 120 can perform basic navigation through the electronic content item 370 without having to return to the ninth UI 360. In some examples, the casting navigation UI controls 624 are determined based on a content type of the electronic content item 370. In the example shown in FIG. 6B, the casting navigation UI controls 624 include a back navigation UI control 624*a* and a forward navigation UI control 624*b* for navigating between successive slides of the electronic content item 370. In some examples, as shown in FIG. 6B, the casting session UI control 620 includes a casting termination UI control 626, and the presenting device 130 is configured to, in response to an actuation of the casting termination UI control 626, terminate the casting component of the session (which may also cause an associated teleconferencing session to be terminated, depending on whether other components, such as an audiovisual component, are active in the session).

FIG. 6C shows a different example in which the display 132 is being used for an additional activity while the casting session continues. In this example, the presenter 120 has moved to a home screen of the presenter device 120, showing icons for other applications which may be executed on the presenter device 120. In FIG. 6C, the presenter device 130 is configured to present a casting session UI control 630 while the casting session remains active, much as with the casting session UI control 620 in FIG. 6B. In FIG. 6C, the casting session UI control 630 is presented as a colored "pill" surrounding a display of the current time. The also serves as a casting return UI control 632, which operates as described for the casting return UI control 622 in FIG. 6B to return to the ninth UI 360 as shown in FIG. 6A. In some examples, the casting session UI control 630 may also be shown while another application, such as an application corresponding to one of the icons in FIG. 6C, is presenting a UI on the display 132, thereby continuing to provide a discreet and readily available UI control 630 for returning to the ninth UI 360 to control the casting session.

FIGS. 7A, 7B, 7C, 7D, 7E, and 7F illustrate examples of a sixth participant device 704 identifying actions performed by a tenth attendee 702 and transmitting corresponding encoded actions, and corresponding responses by a fourth target device 712, including effects associated with a casting mode that may be selectively changed by the tenth attendee 702. In the discussions of FIGS. 7A-7E, a first environment 700, the fourth target device 712, the sixth participant device 704, and the tenth attendee 702 respectively correspond to the third environment 220a, the third target device 240b, the fourth participant device 230d, and the seventh attendee 220d shown in FIG. 2A. Accordingly, the sixth participant device 704 and the fourth target device 712 are described as interacting with the teleconferencing service 260 and other features shown and described in FIGS. 2A and 2B. Additionally, the sixth participant device 704 includes the features shown and described in FIG. 2C and the fourth target device 712 includes the features shown and described in FIG. 2D. Also, the examples in FIGS. 7A-7E may include any of the features described for FIGS. 1A-6C and 8. A second electronic content item 708 is being casted in FIGS. 7A-7E, with the sixth participant device 704 operating as a presenter device.

Figure 7A:
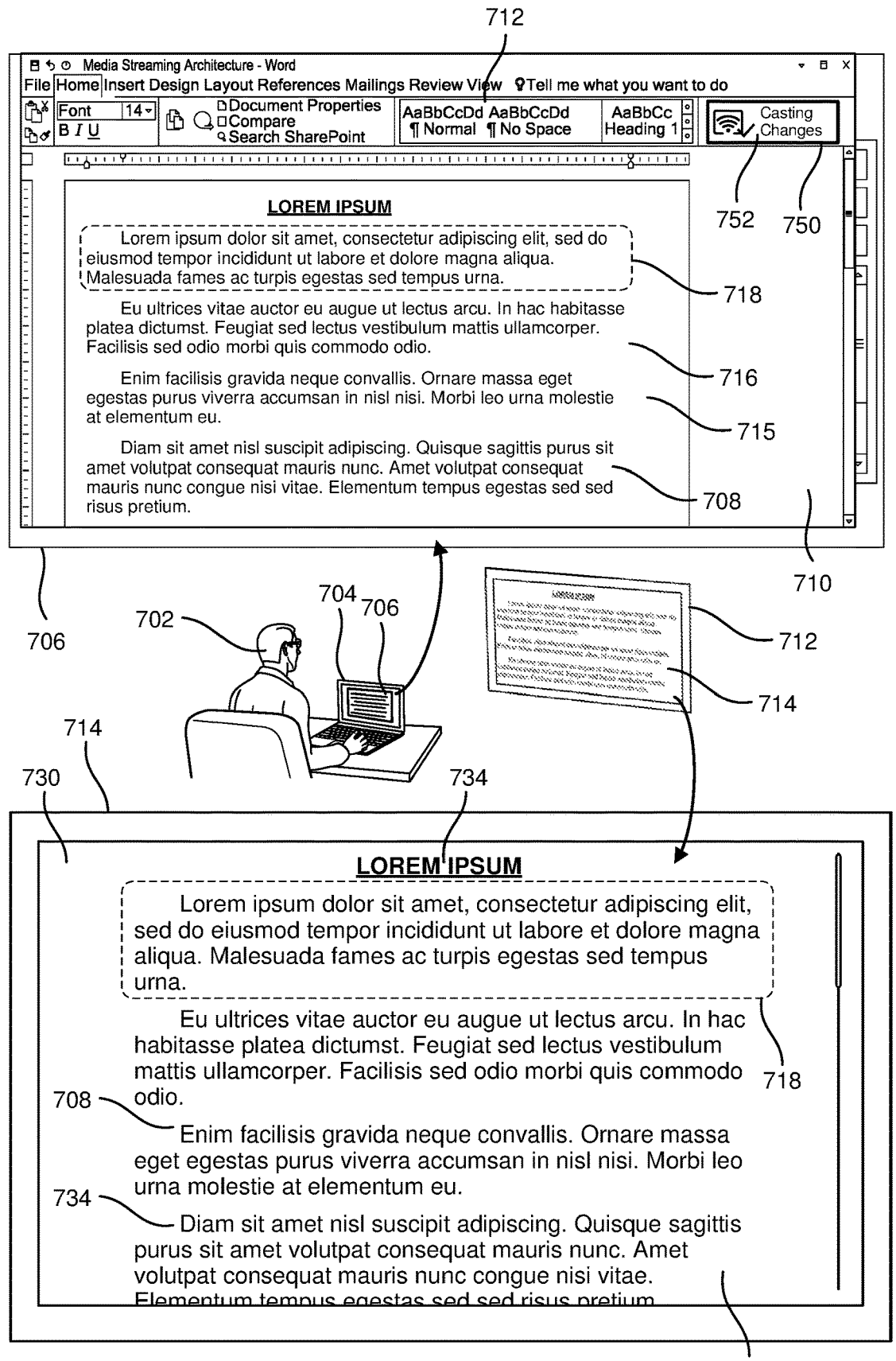
FIGS. 7A, 7B, 7C, 7D, 7E, and 7F illustrate examples of a presenter device identifying actions performed by a second attendee and transmitting corresponding encoded actions, and corresponding responses by a second casting target computing device, including effects associated with a casting mode that may be selectively changed by a presenter.

FIG. 7A illustrates examples of a thirteenth UI 710 rendering the second electronic content item 708 on a display 706 of the presenter device 704 and a fourteenth UI 730 rendering the second electronic content item 708 on a display 714 of the fourth target device 712. In this example, the thirteenth UI 710 is presented by the native application 233a, which is a content creation application presenting a full-featured UI including UI controls 712. The native application 233a is rendering the second electronic content item 708 as a first rendered content 716 in a first content rendering portion 715 of the thirteenth UI 710. Additionally, in this example the presenter device 704 is configured to present a casting mode UI control 750 for changing operation of the presenter device 704 between two or more different casting modes in which actions performed on the presenter device 704 may be selectively provided to other endpoints of the casting session under control of the tenth attendee 702. In this example, the casting mode UI control 750 is included in the thirteenth UI 710. In FIG. 7A, a first visual treatment 752 (in this example, displaying an emphasized border, a checkmark, and the text "Casting Changes") is applied to the casting mode UI control 750 to visually indicate that the presenter device 704 is operating in a first casting mode in which encoded actions are generated without restriction. In this example, the native application 243a is rendering the second electronic content item 708 as a second rendered content 734 in a second content rendering portion 732 of the fourteenth UI 730. As shown in FIG. 7A, the first rendered content 716 and the second rendered content 734 can have different appearances, which may include, as seen in FIG. 7A, differences in line breaks for text elements. A first content portion 718 of the second electronic content item 708 is rendered by both devices 704 and 710.

Figure 7B:
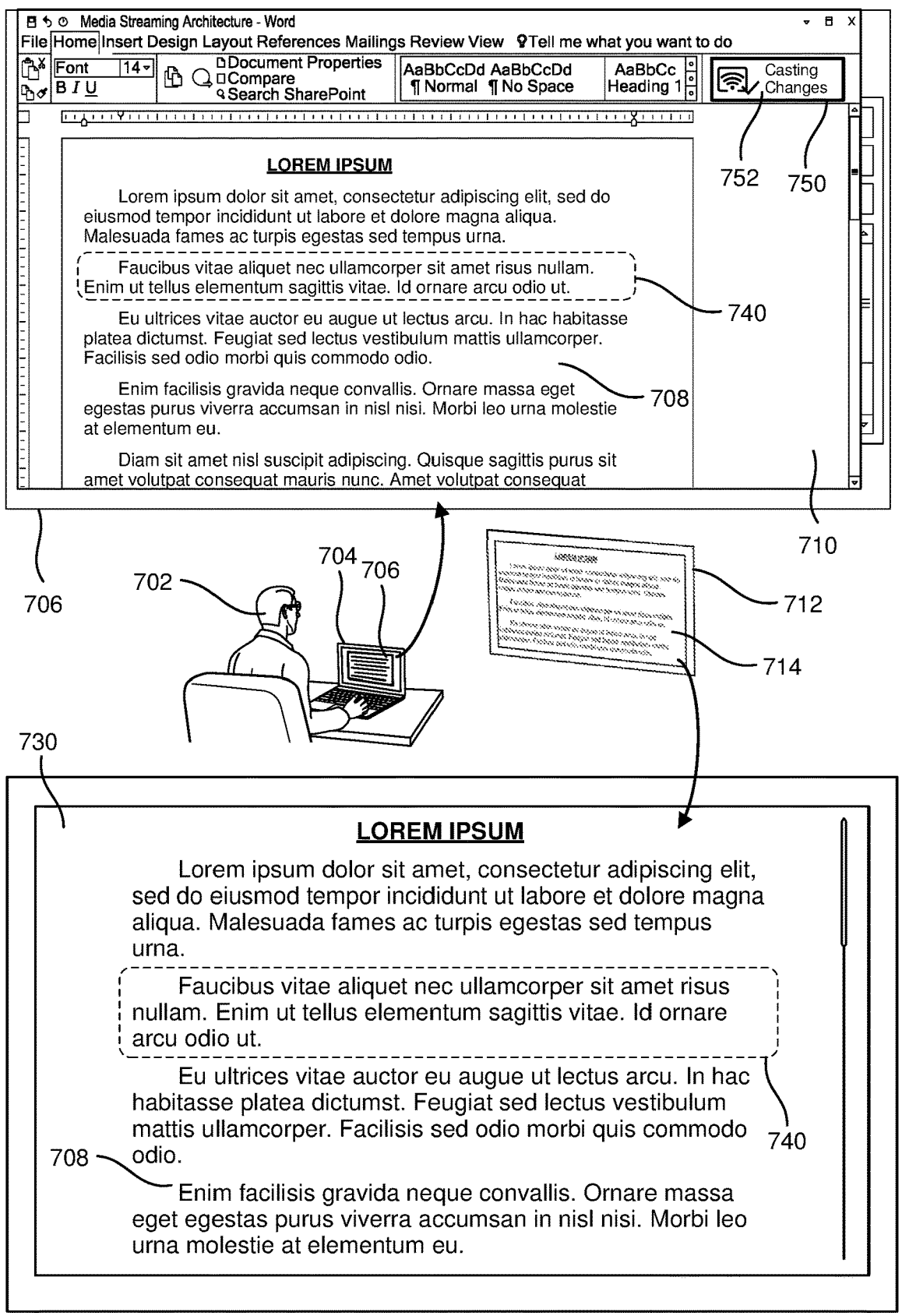

Continuing from FIG. 7A, FIG. 7B shows an example in which the presenter 702 has used the presenter device 704 to add a second content portion 740 to the second electronic content item 708, resulting in the fourth target device 712 rendering the second content portion 740 via the casting session. As indicated by the first visual treatment 752 applied to the casting mode UI control 750, the presenter device 704 is operating in the first casting mode, in response to which it distributed encoded actions corresponding to the addition of the second content portion 740.

Figure 7C:
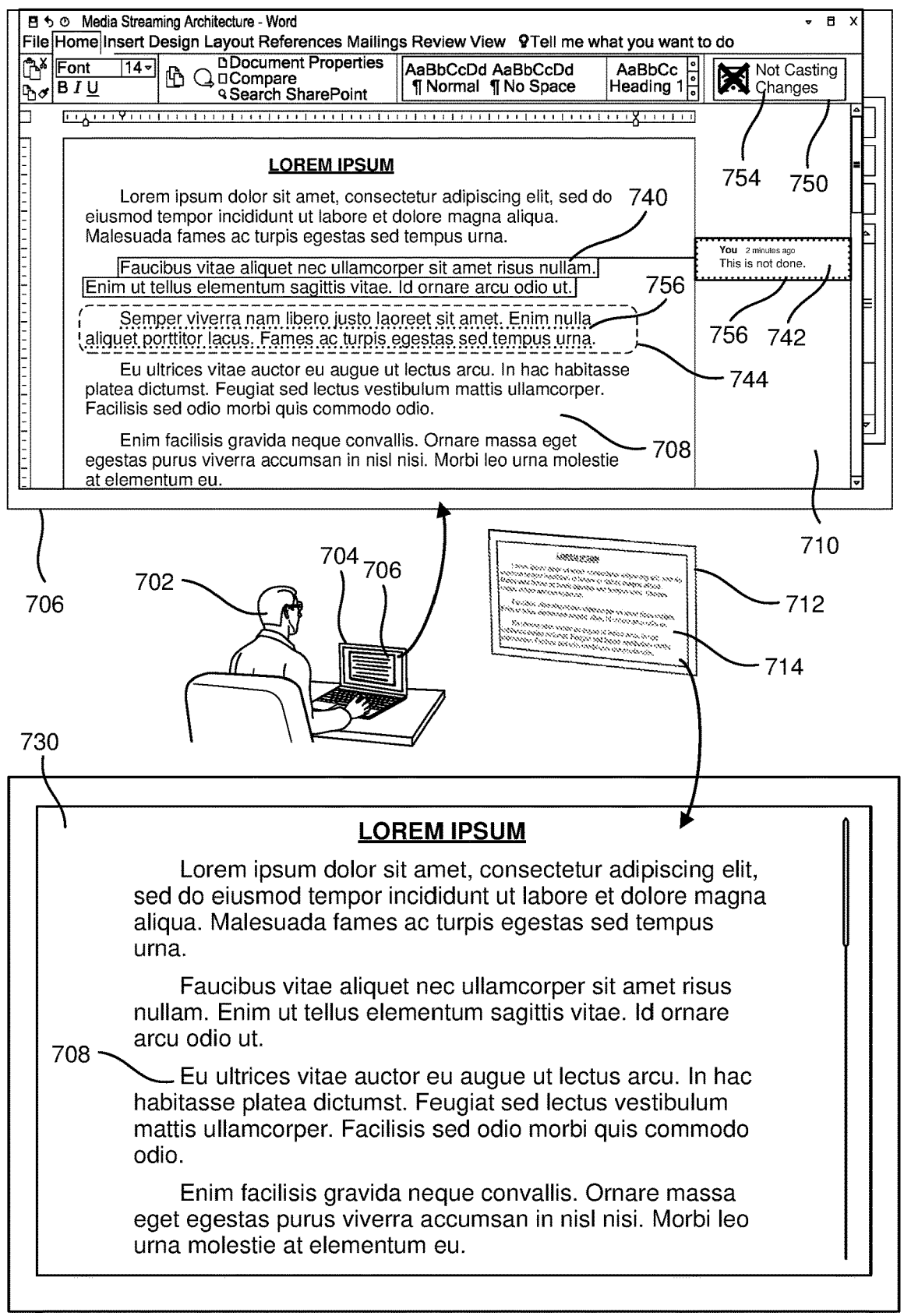

Continuing from FIG. 7B, FIG. 7C shows an example in which the presenter 702 has actuated the casting mode UI control 750, in response to which the presenter device 704 has changed from operating in the first casting mode to a second casting mode in which the presenter device 704 will not automatically generate and distribute encoded actions that would be generated and distributed when operating in the first casting mode. In FIG. 7C, a second visual treatment 754 (in this example, displaying an unemphasized border, a large "X," and the text "Not Casting Changes") is applied to the casting mode UI control 750 to visually indicate that the presenter device 704 is operating in the second casting mode. The presenter 702 may actuate the casting mode UI control 750 to return to the first casting mode. In response to operating in the second casting mode, although the presenter 702 has further added a third content portion 742 (a comment for the second content portion 740) and a fourth content portion 744 (additional text) which are displayed by the presenter device 704, corresponding encoded actions were not generated or distributed in response to operation in the second casting mode. Accordingly, the rendering of the second electronic content 708 by the fourth target device 710 remains unchanged from FIG. 7B. In some implementations, a third visual treatment 756 may be applied to a content portion that is not being casted to provide an indication that content portion has not been casted.

Figure 7D:
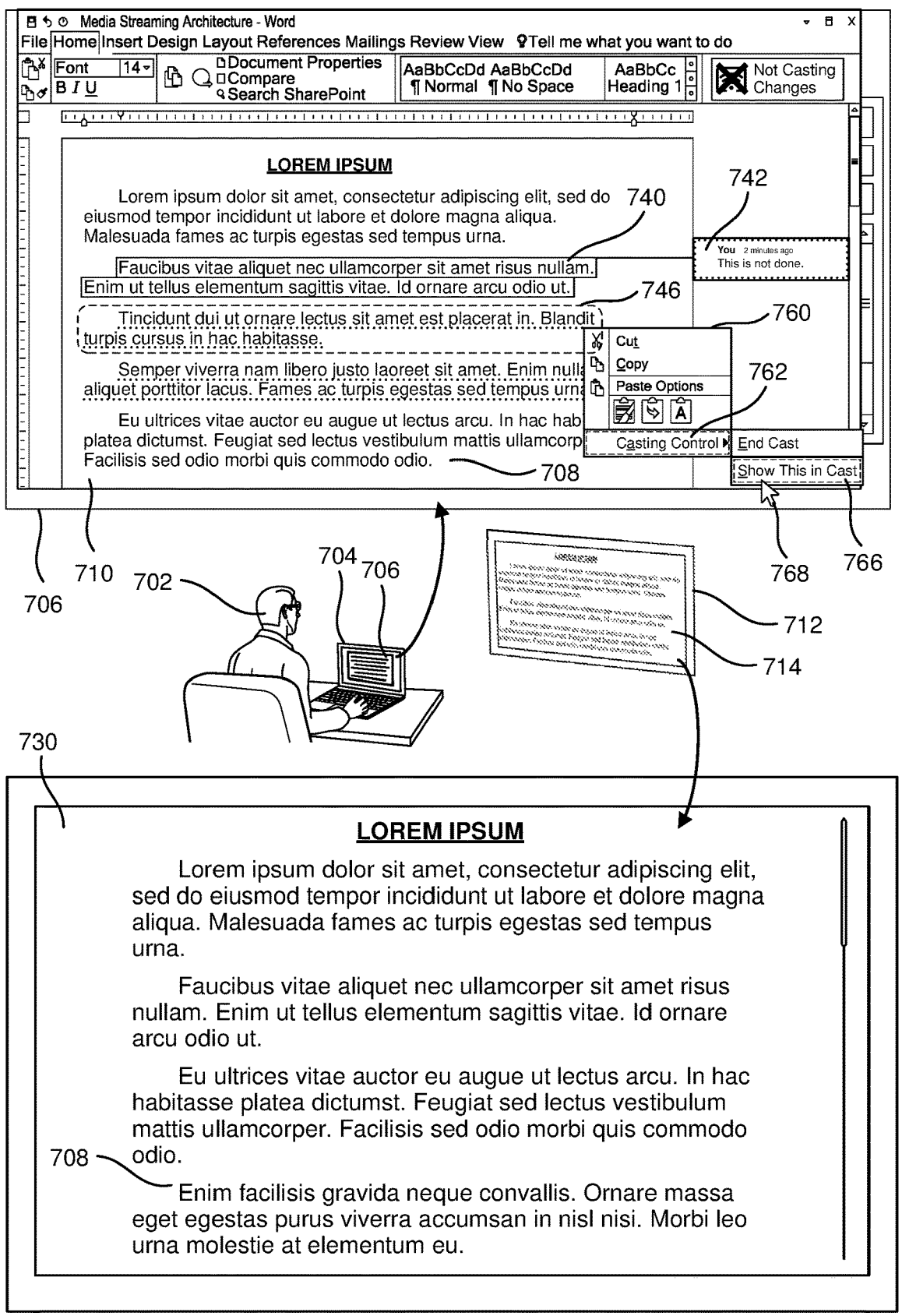

Continuing the example of FIG. 7C, FIG. 7D illustrates an example in which, while continuing to operate in the second casting mode, the presenter 702 has further added a fifth content portion 746 to the second electronic content 708, and is also selectively choosing to cast the initially uncasted fifth content portion 746. In response to operating in the second casting mode, no encoded actions are generated in real-time that correspond to the addition of the fifth content portion 746. In this example, after adding the fifth content portion 746, the presenter 702 has selected the fifth content portion 746 and is, via a casting control UI element 762 included in a right-click menu UI 750, using a pointer 768 to actuate a cast selection UI control 766 to cause the initially uncasted fifth content portion 746 to be casted. In some implementations, content portions not casted while operating in the second casting mode will remain uncasted even when the casting mode UI control 750 is actuated to return to the first casting mode. In some implementations a casting-disabled flag be stored in a file containing an electronic content item for content portions that are not to be casted, to persistently maintain the casting-disabled status of those content portions in later casting sessions. In some implementations, a content creation application is configured to, outside and in advance of a casting session, allow a user to designate casting-disabled content portions. For example, "reserve" slides in a slide deck mat be tagged as casting-disabled to prevent viewing by other participants 220, with the presenter 702 being able to dynamically cause those slides to be cast on demand if desired.

Figure 7E:
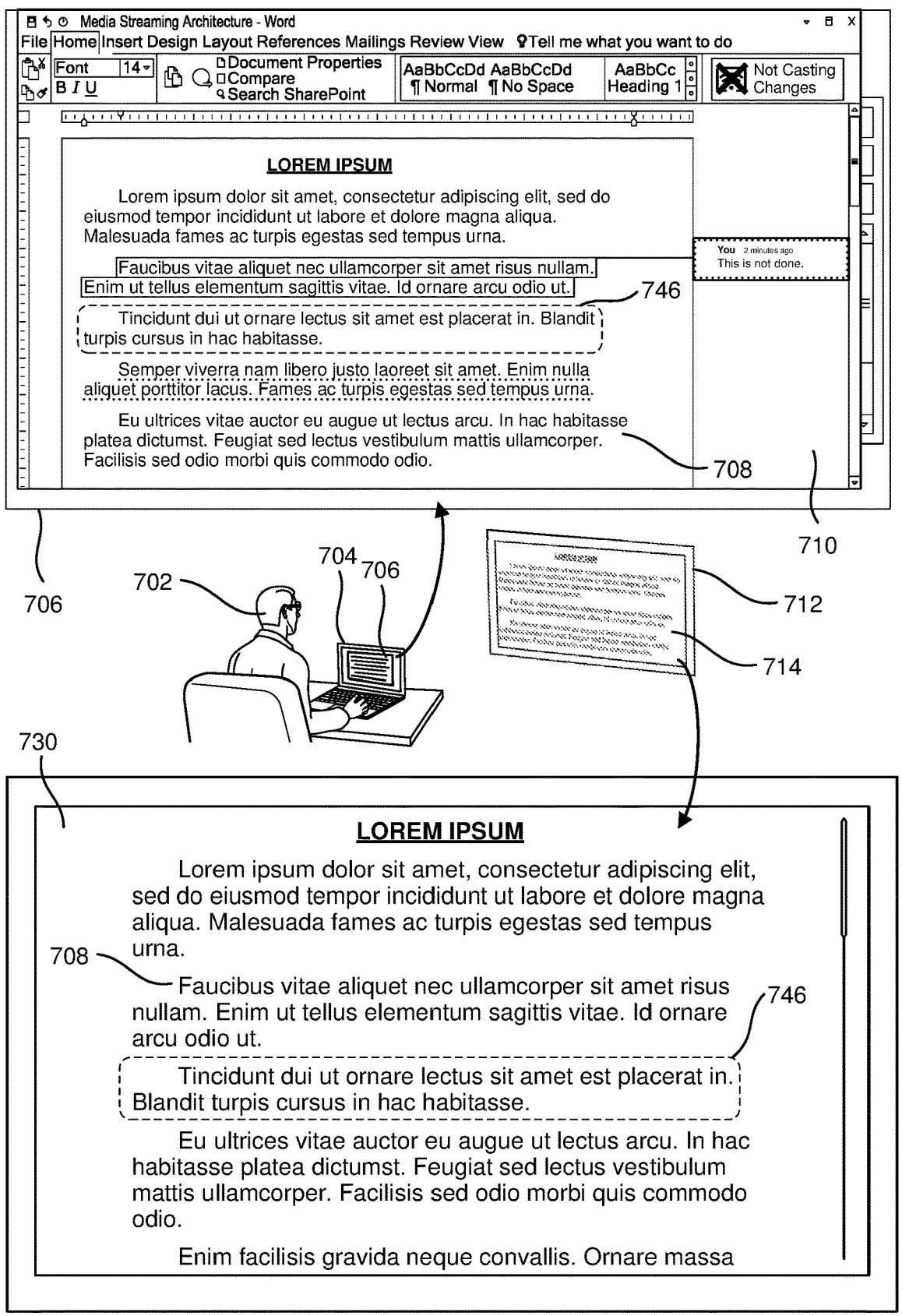

Continuing the example of FIG. 7D, FIG. 7E illustrates the fifth content portion 746 having been casted to the fourth target device 710 in response to the actuation of the cast selection UI control 766 in FIG. 7D. In response to the actuation of the cast selection UI control 766, the presenter device 704 has generated and distributed encoded actions corresponding to an addition of the fifth content portion 746 (which may be different than the encoded actions that would have been generated in real-time in the presenter device 704 had been operating in the first casting mode), resulting in the fourth target device 712 rendering the fifth content portion 746 via the casting session, as seen in FIG. 7E. In some implementations, the presenter 702 can effectively "uncast" a selected content portion via similar UI interactions, resulting in encoded actions being distributed that remove the selected content portion at the non-presenting endpoints without removing it at the presenting device 702.

Figure 7F:
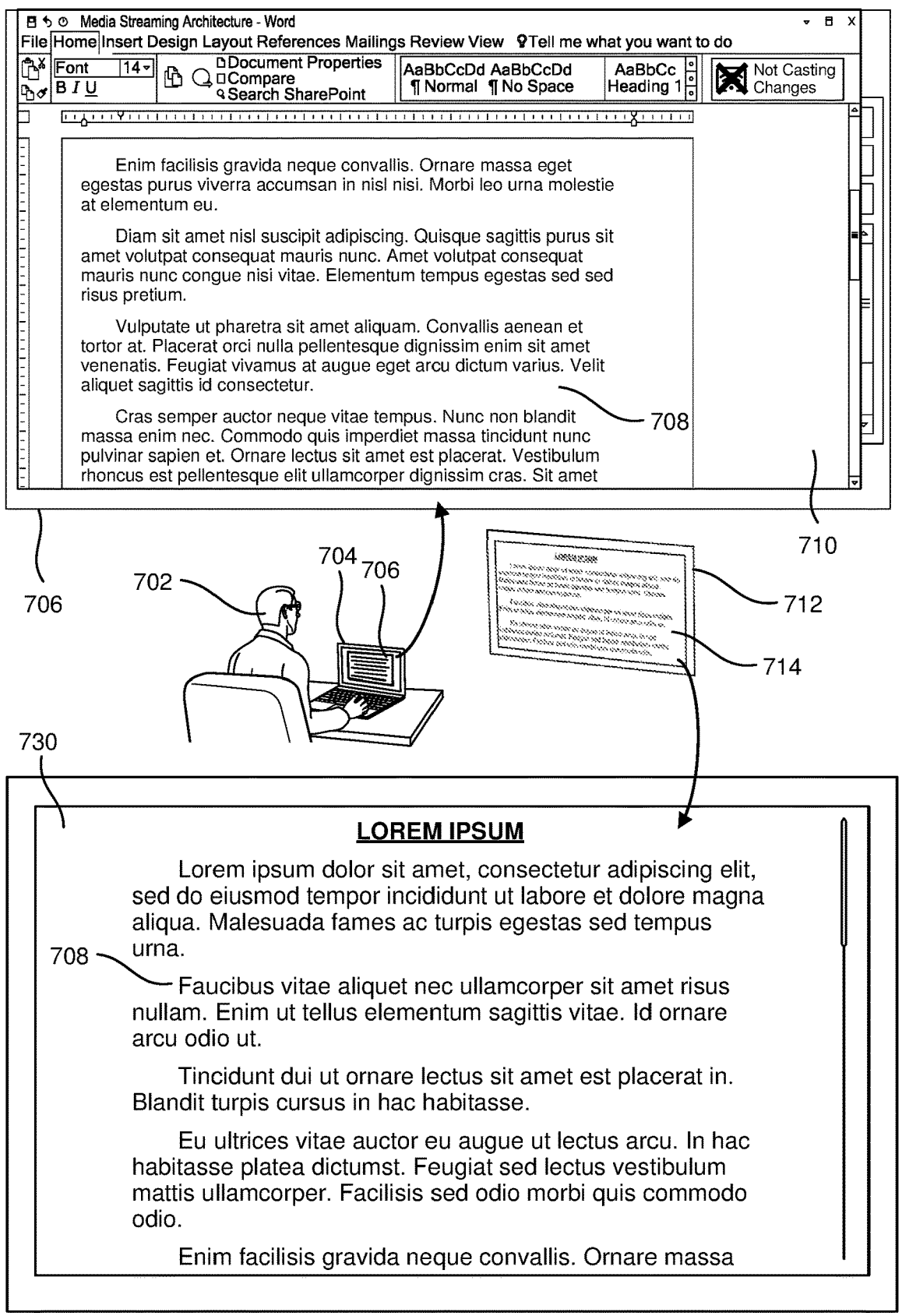

Continuing the example of FIG. 7E, FIG. 7F illustrates an example in which encoded navigation actions are not generated in response to operating in the second casting mode. While continuing to operate in the second casting mode, the presenter 702 has navigated from the position in the second electronic content 708 shown in FIG. 7E (at the beginning of the second electronic content item 708) to a different position. However, in response to operating in the second casting mode no corresponding encoded navigation actions are generated. Accordingly, the rendering of the second electronic content 708 by the fourth target device 710 remains unchanged from FIG. 7E. In some examples, the thirteenth UI 710 provides an indication (not shown) of the position last provided to the endpoints via the casting session. In some examples, a UI control (not shown) is provided, which may be actuated to return the presenter device 704 to the position last provided to the endpoints. In some examples, in response to a return to the first casting mode, the presenter device 704 may automatically return the presenter device 704 to the position last provided to the endpoints.

In some implementations, a UI (not shown) may be provided to the presenter 702 allowing for selectively enabling or disabling the generation of encoded actions for specific types of actions ("content action types") while operating in the second casting mode. Via such as UI, the presenter 702 may separately choose whether to cast content editing actions (and/or specific types of content editing actions, such as adding/removing comments), navigation actions, and/or annotation actions. Accordingly, annotation casting may continue to be performed in both the first and second casting modes, while casting of content editing and navigation actions is not automatically performed in the second casting mode, as shown in FIGS. 7C, 7D, and 7F.

Figure 8:
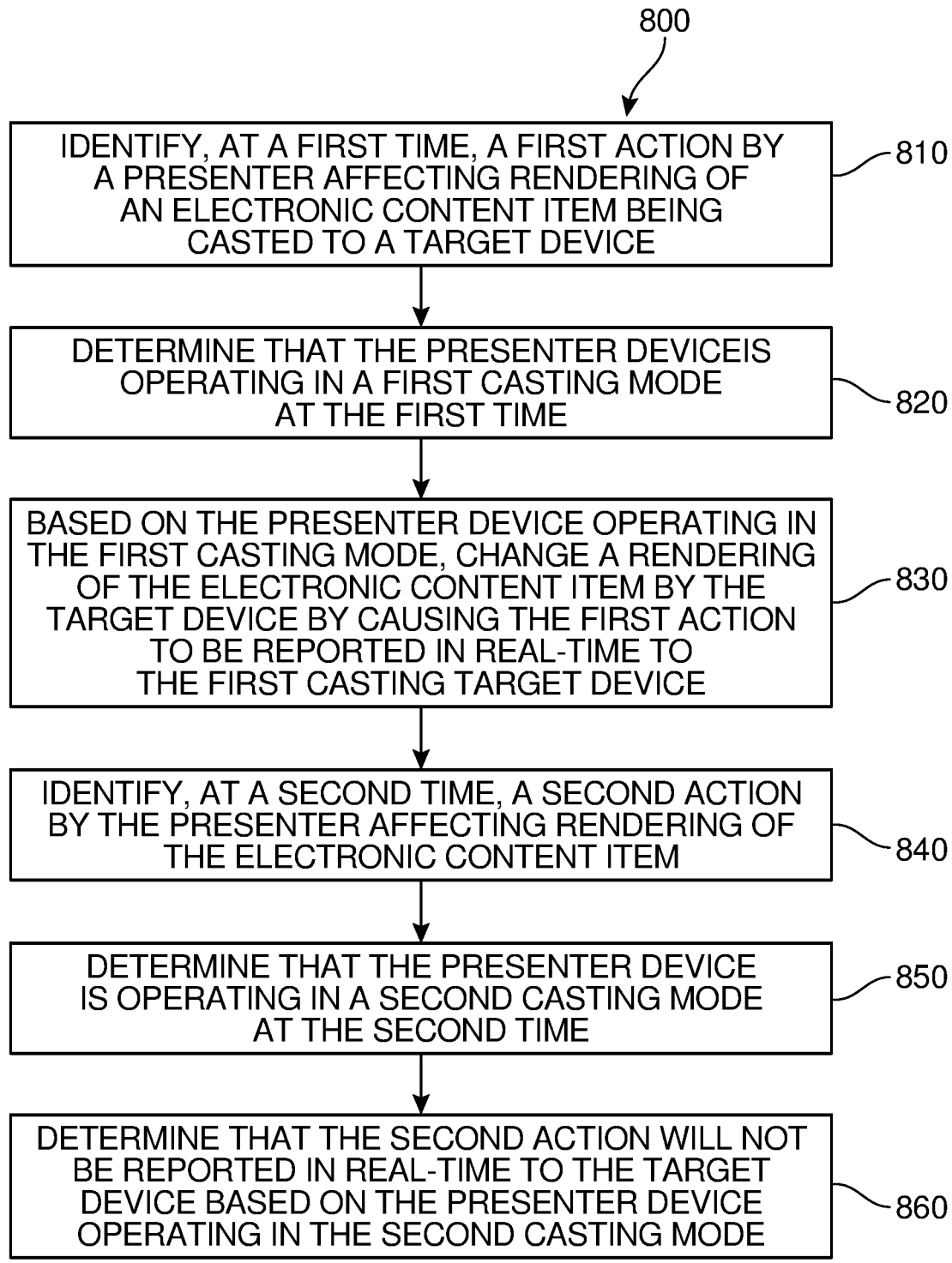
FIG. 8 is a flow chart illustrating an implementation of an example process for casting an electronic content item to a casting target computing device.

FIG. 8 is a flow chart illustrating an implementation of an example process 800 for casting an electronic content item to a target computing device. In some examples, some or all of the process 800 may be performed in combination with any of the features discussed in connection with FIGS. 1A-7F, 9, and 10, although they may also be performed with any other features described herein. In FIG. 8, a first operation 810 may include identifying, at a first time during a casting session, a first action performed by a user of a presenter computing device affecting rendering of a first electronic content item being casted to a first target computing device via the casting session. In a second operation 820, the process 800 may include determining that the presenter computing device is operating in a first casting mode at the first time. In a third operation 830, the process 800 may include, based on at least the determination that the presenter computing device is operating in the first casting mode at the first time, changing a rendering of the first electronic content item by the first target computing device by causing the first action to be reported in real-time to the first target computing device.

In a fourth operation 840, the process 800 includes identifying, at a second time during the casting session, a second action performed by the user affecting rendering of the first electronic content item, wherein the second time is different than the first time. In a fifth operation 850, the process 800 includes determining that the presenter computing device is operating in a second casting mode different than the first casting mode at the second time. In a sixth operation 860, the process 800 includes determining that the second action will not be reported in real-time to the target computing device based on at least the determination that the presenter computing device is operating in the second casting mode at the second time.

The detailed examples of systems, devices, and techniques described in connection with FIGS. 1A-8 are presented herein for illustration of the disclosure and its benefits. Such examples of use should not be construed to be limitations on the logical process embodiments of the disclosure, nor should variations of user interface methods from those described herein be considered outside the scope of the present disclosure. In some embodiments, various features described in FIGS. 1A-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 9:
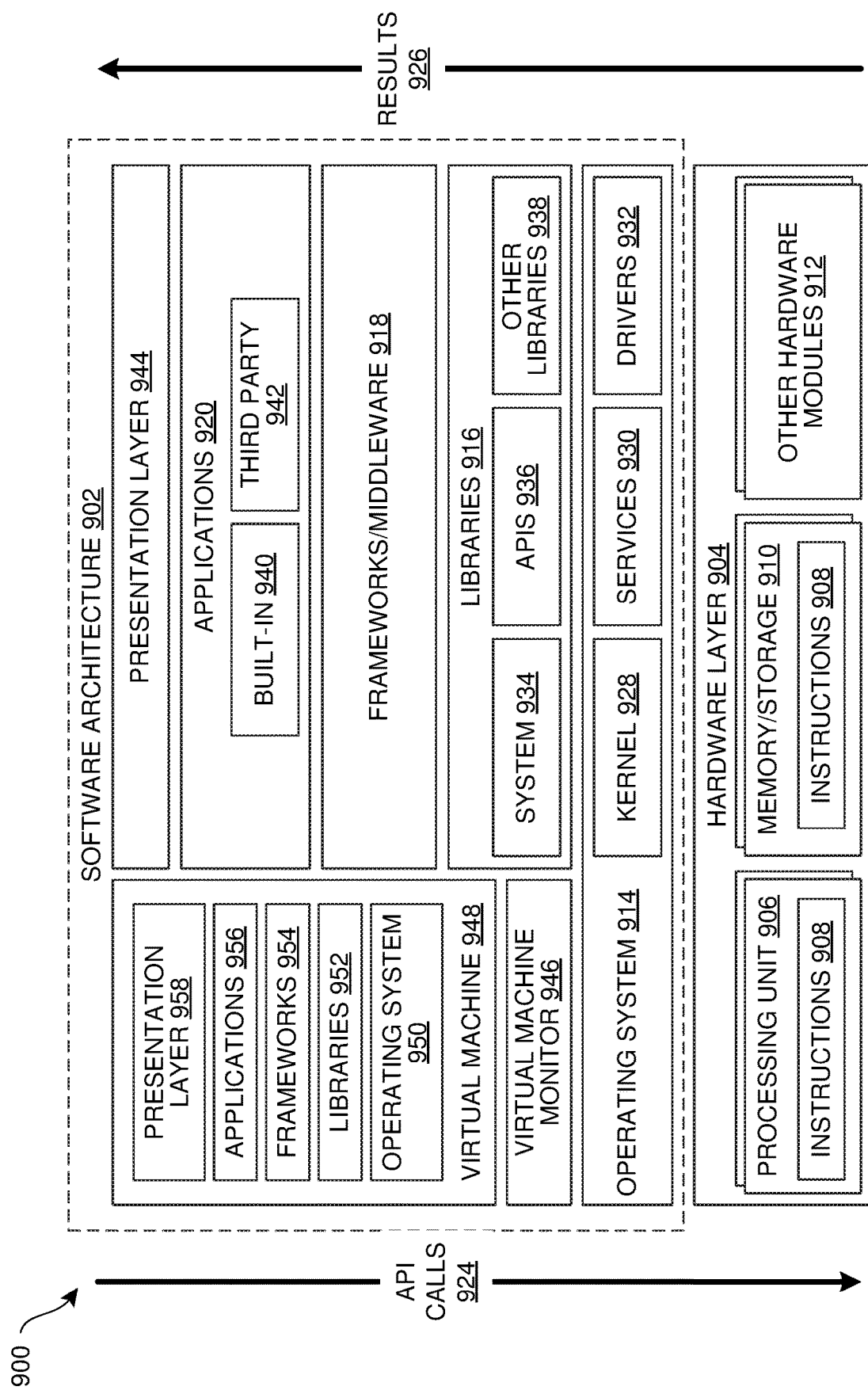
FIG. 9 is a block diagram illustrating an example software architecture, various portions of which may be used in conjunction with various hardware architectures herein described, which may implement any of the features herein described.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 908 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 1000 of FIG. 10, for example). The virtual machine 948 may be hosted by a host OS (for example, OS 914) or hypervisor, and may have a virtual machine monitor 946 which manages the operation of the virtual machine 948 and interoperation with the host operating system. A software architecture, which may be different from software architecture 902 outside of the virtual machine, executes within the virtual machine 948 such as an OS 950, libraries 952, frameworks 954, applications 956, and/or a presentation layer 958.

Figure 10:
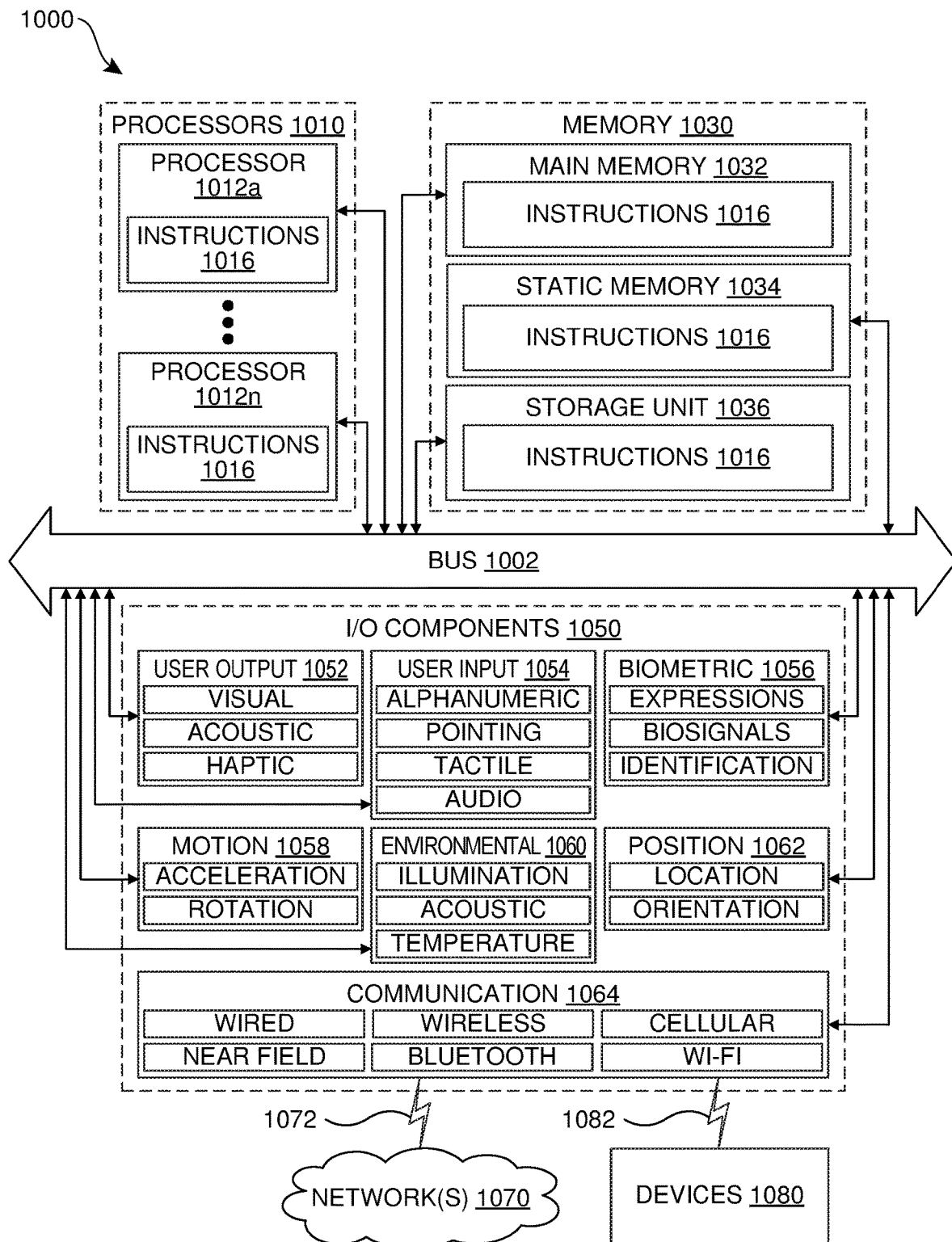
FIG. 10 is a block diagram illustrating components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056, motion components 1058, environmental components 1060, and/or position components 1062, among a wide array of other physical sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1058 may include, for example, acceleration sensors (for example, an accelerometer) and rotation sensors (for example, a gyroscope). The environmental components 1060 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

The disclosed implementations can incorporate any of the features, components, methods, systems, software, and other aspects described in U.S. Patent Application Publication Numbers 2005/0091302 (entitled "Systems and methods for projecting content from computing devices" and published on Apr. 28, 2005), 2005/0091359 (entitled "Systems and methods for projecting content from computing devices" and published on Apr. 28, 2005), 2013/0110937 (entitled "REAL TIME DOCUMENT PRESENTATION DATA SYNCHRONIZATION THROUGH GENERIC SERVICE" and published on May 2, 2013), 2014/0310327 (entitled "SYNCHRONIZATION ACROSS APPLICATIONS" and published on Oct. 16, 2014), 2016/0072857 (entitled "ACCESSIBILITY FEATURES IN CONTENT SHARING" and published on Mar. 10, 2016), 2016/0182603 (entitled "Browser Display Casting Techniques" and published on Jun. 23, 2016), 2016/0373512 (entitled "DELEGATION OF RENDERING BETWEEN A WEB APPLICATION AND A NATIVE APPLICATION" and published on Dec. 22, 2016), 2018/0048590 (entitled "CONTROL OF CASTING TO A MEDIA RENDERER" and published on Feb. 15, 2018), 20180109566 (entitled "Universal Casting Service" and published on Apr. 19, 2018), 2018/0241755 (entitled "Meeting Join for Meeting Device" and published on Aug. 23, 2018), 2019/0065457 (entitled "APPLICATION/DOCUMENT COLLABORATION IN A MULTI-DEVICE ENVIRONMENT" and published on Feb. 28, 2019), and 2019/0295439 (entitled "CROSS-APPLICATION FEATURE LINKING AND EDUCATIONAL MESSAGING" and published on Sep. 26, 2019); and U.S. Pat. No. 9,276,972 (entitled "Real-time media optimization over remoted sessions" and issued on Mar. 1, 2016), each of which are incorporated by reference herein in their entireties.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system comprising one or more processors and machine-readable media including instructions which, when executed by the one or more processors, cause the one or more processors to:
   identify, at a first time during a casting session, a first action of changes performed on a presenter computing device affecting rendering of a first electronic content item being casted to a first target computing device via the casting session;
   cause a primary display associated with the presenter computing device to display the first electronic content item applying the first action of changes;
   determine that the presenter computing device is operating in a first casting mode at the first time;
   based on at least determining that the presenter computing device is operating in the first casting mode at the first time, change the rendering of the first electronic content item by the first target computing device by causing the first action of changes to be reported to the first target computing device;
   identify, at a second time during the casting session, a second action of changes performed on the presenter computing device to the first electronic content item, wherein the second time is different than the first time;
   cause the primary display associated with the presenter computing device to display the first electronic content item applying the second action of changes;
   determine that the presenter computing device is operating in a second casting mode different than the first casting mode at the second time; and
   cause the first target computing device to maintain the rendering of the first electronic content item unchanged without applying the second action of changes, while the primary display displaying the first electronic content item with the applied second action of changes, based on at least determining that the presenter computing device is operating in the second casting mode at the second time.

2. The system of claim 1, wherein:
   the first action of changes makes a first edit to the first electronic content item,
   the second action of changes makes a second edit to the first electronic content item, and
   in response to identifying the first edit when the presenter computing device was operating in the first casting mode and identifying the second edit when the presenter computing device was operating in the second casting mode, only the first edit of the first electronic content item is rendered on the first target computing device.

3. The system of claim 1, wherein the instructions further cause the one or more processors to:
   add a first content portion to the first electronic content item based on the first action of changes;
   add a second content portion to the first electronic content item based on the second action of changes;
   render, at the presenter computing device, the second content portion with a first visual treatment indicating the second content portion has not been casted; and
   render, at the presenter computing device, the first content portion without the first visual treatment.

4. The system of claim 3, wherein the instructions further cause the one or more processors to:
   receive, at the presenter computing device, a selection of a third content portion of the first electronic content item;
   receive, at a third time, a command at the presenter computing device to not cast the selected third content portion;
   store, in response to receiving the command and before the casting session, a casting-disabled flag for the third content portion in a file; and
   render, at the presenter computing device, the third content portion with the first visual treatment based on at least the casting-disabled flag for the third content portion being stored in the file.

5. The system of claim 1, wherein the instructions further cause the one or more processors to:
   cause the first target computing device to render the first electronic content item using a first native application executing on the first target computing device, wherein the first native application is configured to interpret and render the first electronic content item using computing resources provided by the first target computing device.

6. The system of claim 1, wherein the instructions further cause the one or more processors to:
   change from rendering a first portion of the first electronic content item at the presenter computing device to rendering a different second portion of the first electronic content item at the presenter computing device in response to the second action of changes; and return to rendering the first portion of the first electronic content item at the presenter computing device in response to a transition to operating in the first casting mode.

7. The system of claim 1, wherein the instructions further cause the one or more processors to:

identify, at a third time during the casting session, a third action of changes performed on the presenter computing device that causes an annotation to be rendered for the first electronic content item, wherein the third time is different than the second time;

determine that the presenter computing device is operating in the second casting mode at the third time;

determine that the third action is of an annotation content action type; and based on at least determining that the third action is of the annotation content action type, change the rendering of the first electronic content item by the first target computing device by causing the third action of changes to be reported to the first target computing device.

8. The system of claim 1, wherein the instructions further cause the one or more processors to:

detect that a first edit has been made to the first electronic content item using a third native application executed by an endpoint computing device of the casting session during use of the third native application by the endpoint computing device to render the first electronic content item for the casting session; and create, in response to detection of the first edit, a second electronic content item different than the first electronic content item to reflect the first edit having been applied to the first electronic content item.

9. The system of claim 1, wherein the instructions further cause the one or more processors to:

identify a participant computing device, different than the presenter computing device, as a non-presenter endpoint of the casting session;

cause, in response to an identification of the participant computing device as the non-presenter endpoint of the casting session, the participant computing device to render the first electronic content item using a native application executing on the participant computing device, wherein the native application is configured to interpret and render the first electronic content item using computing resources provided by the participant computing device; and change a rendering of the first electronic content item by the participant computing device by causing the first action of changes to be reported to the participant computing device.

10. The system of claim 8, wherein the instructions further cause the one or more processors to:

add a second content portion to the first electronic content item based on the second action of changes;

receive, at the presenter computing device, a selection of the second content portion;

receive, at a third time that the second content portion remains uncasted, a command at the presenter computing device to cast the selected second content portion; and change the rendering of the first electronic content item by the first target computing device to include the second content portion by causing a third action of changes corresponding to an addition of the second content portion to be reported to the first target computing device.

11. A method of casting electronic content comprising:

identifying, at a first time during a casting session, a first action of changes performed on a presenter computing device affecting rendering of a first electronic content item being casted to a first target computing device via the casting session;

causing a primary display associated with the presenter computing device to display the first electronic content item applying the first action of changes;

determining that the presenter computing device is operating in a first casting mode at the first time;

based on at least determining that the presenter computing device is operating in the first casting mode at the first time, changing the rendering of the first electronic content item by the first target computing device by causing the first action of changes to be reported in real-time to the first target computing device, identifying, at a second time during the casting session, a second action of changes performed on the presenter computing device to the first electronic content item, wherein the second time is different than the first time;

causing the primary display associated with the presenter computing device to display the first electronic content item applying the second action of changes;

determining that the presenter computing device is operating in a second casting mode different than the first casting mode at the second time; and causing the first target computing device to maintain the rendering of the first electronic content item unchanged without applying the second action of changes, while the primary display displaying the first electronic content item with the applied second action of changes, based on at least determining that the presenter computing device is operating in the second casting mode at the second time.

12. The method of claim 11, wherein:

the first action of changes makes a first edit to the first electronic content item, the second action of changes makes a second edit to the first electronic content item, and in response to identifying the first edit when the presenter computing device was operating in the first casting mode and identifying the second edit when the presenter computing device was operating in the second casting mode, only the first edit of the first electronic content item is rendered on the first target computing device.

13. The method of claim 11, further comprising:

adding a first content portion to the first electronic content based on the first action of changes;

adding a second content portion to the first electronic content based on the second action of changes;

rendering, at the presenter computing device, the second content portion with a first visual treatment indicating the second content portion has not been casted; and rendering, at the presenter computing device, the first content portion without the first visual treatment.

14. The method of claim 13, further comprising:

receiving, at the presenter computing device, a selection of a third content portion of the first electronic content;

receiving, at a third time, a command at the presenter computing device to not cast the selected third content portion;

storing, in response to receiving the command and before the casting session, a casting-disabled flag for the third content portion in a file; and rendering, at the presenter computing device, the third content portion with the first visual treatment based on at least the casting-disabled flag for the third content portion being stored in the file.

15. The method of claim 11, further comprising causing the first target computing device to render the first electronic content item using a first native application executing on the first target computing device, wherein the first native application is configured to interpret and render the first electronic content item using computing resources provided by the first target computing device.

16. The method of claim 11, further comprising:
changing from rendering a first portion of the first electronic content item at the presenter computing device to rendering a different second portion of the first electronic content item at the presenter computing device in response to the second action of changes; and
returning to rendering the first portion of the first electronic content item at the presenter computing device in response to a transition to operating in the first casting mode.

17. The method of claim 11, further comprising:
identifying, at a third time during the casting session, a third action of changes performed on the presenter computing device that causes an annotation to be rendered for the first electronic content item, wherein the third time is different than the second time;
determining that the presenter computing device is operating in the second casting mode at the third time;
determining that the third action is of an annotation content action type; and
based on at least determining that the third action is of the annotation content action type, changing the rendering of the first electronic content item by the first target computing device by causing the third action of changes to be reported to the first target computing device.

18. The method of claim 11, further comprising:
detecting that a first edit has been made to the first electronic content item using a third native application executed by an endpoint computing device of the casting session during use of the third native application by the endpoint computing device to render the first electronic content item for the casting session; and
creating, in response to detection of the first edit, a second electronic content item different than the first electronic content item to reflect the first edit having been applied to the first electronic content item.

19. The method of claim 11, further comprising:
identifying a participant computing device, different than the presenter computing device, as a non-presenter endpoint of the casting session;
causing, in response to an identification of the participant computing device as the non-presenter endpoint of the casting session, the participant computing device to render the first electronic content item using a native application executing on the participant computing device, wherein the native application is configured to interpret and render the first electronic content item using computing resources provided by the participant computing device; and
changing a rendering of the first electronic content item by the participant computing device by causing the first action of changes to be reported to the participant computing device.

20. The method of claim 11, further comprising:
adding a second content portion to the first electronic content item based on the second action of changes;
receiving, at the presenter computing device, a selection of the second content portion;
receiving, at a third time that the second content portion remains uncasted, a command at the presenter computing device to cast the selected second content portion; and
changing the rendering of the first electronic content item by the first target computing device to include the second content portion by causing a third action of changes corresponding to an addition of the second content portion to be reported to the first target computing device.

* * * * *